US012138922B2

(12) United States Patent
Kuroyanagi et al.

(10) Patent No.: US 12,138,922 B2
(45) Date of Patent: Nov. 12, 2024

(54) LIQUID EJECTION DEVICE

(71) Applicant: Brother Kogyo Kabushiki Kaisha, Nagoya (JP)

(72) Inventors: Sosuke Kuroyanagi, Nishio (JP); Yoshinori Osakabe, Seto (JP); Hiroyuki Ishikawa, Nisshin (JP); Fumio Nakazawa, Okazaki (JP); Taichi Shirono, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 178 days.

(21) Appl. No.: 17/809,590

(22) Filed: Jun. 29, 2022

(65) Prior Publication Data

US 2023/0001690 A1 Jan. 5, 2023

(30) Foreign Application Priority Data

Jun. 30, 2021 (JP) ................................ 2021-108816

(51) Int. Cl.
*B41J 2/045* (2006.01)
*B41J 2/175* (2006.01)

(52) U.S. Cl.
CPC ....... *B41J 2/04591* (2013.01); *B41J 2/04541* (2013.01); *B41J 2/04581* (2013.01); *B41J 2/17566* (2013.01)

(58) Field of Classification Search
CPC ........................ B41J 2/04591; B41J 2/04541; B41J 2/04581; B41J 2/17566; B41J 2/04588; B41J 2/16508; B41J 2/16523; B41J 2/16532; B41J 2/17; B41J 2/1714; B41J 2/17513; B41J 2/17556; B41J 29/13
See application file for complete search history.

(56) References Cited

U.S. PATENT DOCUMENTS

| | | | | |
|---|---|---|---|---|
| 6,193,354 B1 * | 2/2001 | Ito | ........................ | B41J 2/17566 347/30 |
| 2002/0057304 A1 | 5/2002 | Akiyama et al. | | |
| 2006/0290723 A1 * | 12/2006 | Jeong | .................. | B41J 2/17566 347/7 |
| 2008/0198187 A1 * | 8/2008 | Aoki | .................. | B41J 2/17566 347/7 |

(Continued)

FOREIGN PATENT DOCUMENTS

| | | | | |
|---|---|---|---|---|
| EP | 872346 A1 * | 10/1998 | ............ | B41J 2/1652 |
| JP | S55-65560 A | 5/1980 | | |

(Continued)

OTHER PUBLICATIONS

Puigardeu Aramendia Sergio; Printer Drive Signal Control, All Pages (Year: 2016).*

(Continued)

*Primary Examiner* — Justin Seo
*Assistant Examiner* — Tracey M McMillion
(74) *Attorney, Agent, or Firm* — Scully, Scott, Murphy & Presser, P.C.

(57) ABSTRACT

A liquid ejection device includes a head having a nozzle, an element causing the nozzle to eject liquid, a reservoir configured to store the liquid to be supplied to the nozzle, and a controller. The controller is configured to change a drive signal to drive the element based on a quantity of the liquid stored in the reservoir.

18 Claims, 14 Drawing Sheets

(56) References Cited

U.S. PATENT DOCUMENTS

| | | | | |
|---|---|---|---|---|
| 2009/0102902 | A1* | 4/2009 | Nose | B41J 2/17566<br>347/86 |
| 2016/0279963 | A1* | 9/2016 | Koganehira | B41J 29/13 |

FOREIGN PATENT DOCUMENTS

| | | | | |
|---|---|---|---|---|
| JP | 2002-144557 | A | 5/2002 | |
| WO | WO-2016015773 | A1 * | 2/2016 | B41J 2/04515 |

OTHER PUBLICATIONS

Puigardeu Aramendia, Sergio, Printing Drive Signal Control, Feb. 4, 2016, All Pages (Year: 2016).*
Ito Masaharu, Ink Jet Recorder, Oct. 21, 1998, Europe, All Pages (Year: 1998).*

* cited by examiner

LIQUID EJECTION DEVICE

REFERENCE TO RELATED APPLICATIONS

This application claims priority under 35 U.S.C. § 119 from Japanese Patent Application No. 2021-108816 filed on Jun. 30, 2021. The entire subject matter of the application is incorporated herein by reference.

BACKGROUND ART

The present disclosures relate to a liquid ejection device equipped with a head configured to eject liquid that is supplied from a liquid reservoir to the head.

Conventionally, as an image recording device, an inkjet pen has been known. The inkjet pen is typically configured to eject ink stored in a tank from nozzles. Such an inkjet pen is typically configured such that a liquid level of the ink stored in an ink cartridge is higher than openings of the nozzles. The ink cartridge may not have a gas layer connected to the outside, or may have a valve in the gas flow channel that connects the gas layer to the outside.

As the position of the ink surface in the ink cartridge changes with ink consumption, a hydraulic head difference between a meniscus at the nozzle opening and the ink surface fluctuates. When the hydraulic head difference fluctuates, the quantity of droplets ejected from the nozzles fluctuates even if a pressurizing element is driven at a constant level. As a result, recorded image quality may be deteriorated or meniscus fluctuations at nozzles may become unstable.

DESCRIPTION

According to aspects of the present disclosure, there is provided a liquid ejection device, including a head having a nozzle, an element causing the nozzle to eject liquid, a reservoir configured to store the liquid to be supplied to the nozzle, and a controller. The controller can change a drive signal to drive the element based on a quantity of the liquid stored in the reservoir.

Figure 1:
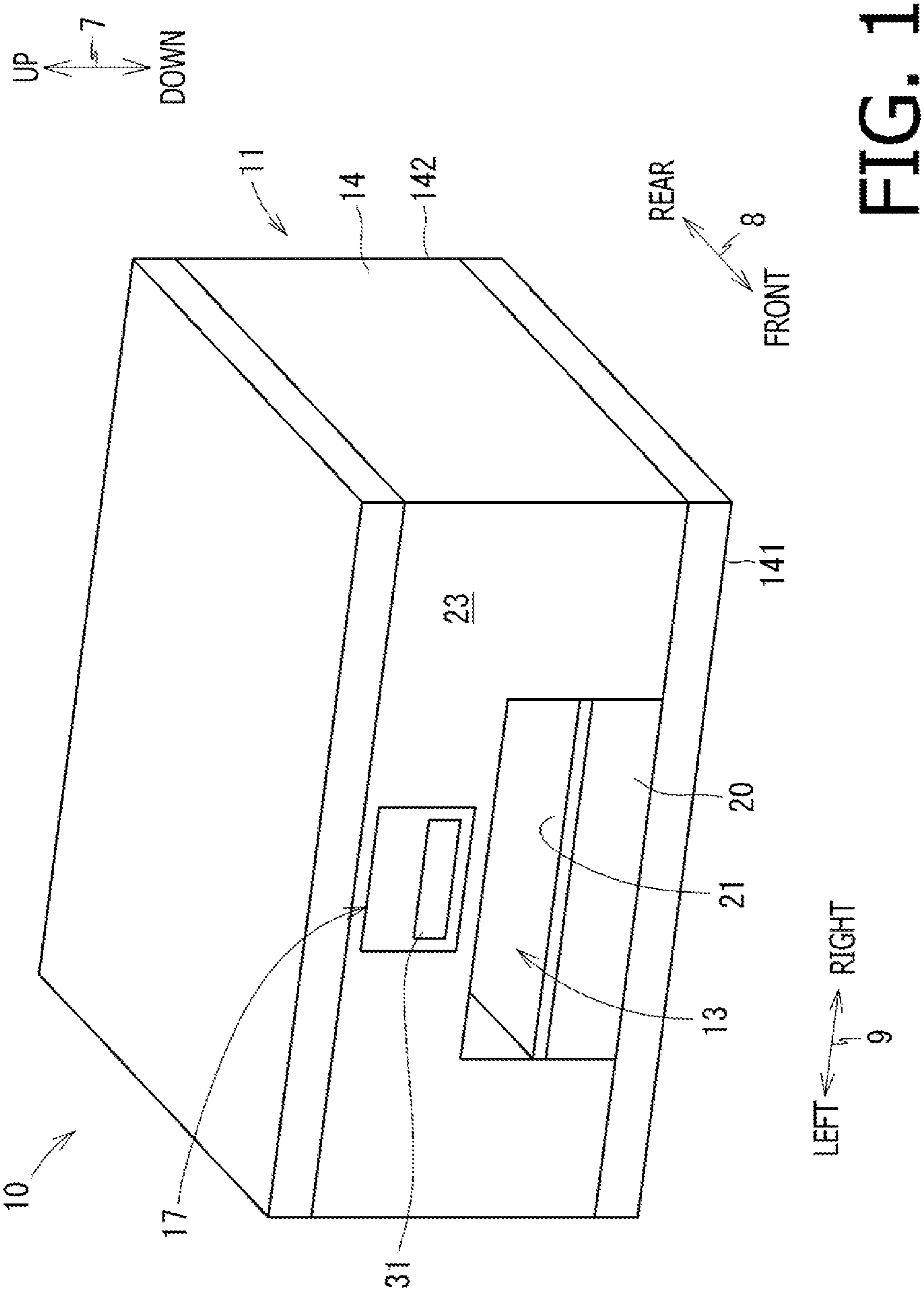
FIG. 1 is a perspective view of an MFP (multi-function peripheral) according to the present disclosures.

Hereinafter, referring to the accompanying drawings, an embodiment of the present disclosures will be described. It is noted that an embodiment described below is only one example, and can be modified as needed without departing from aspects of the present disclosures. In the following description, a direction indicating a progress on a line connecting a starting point and an end point of an arrow will be referred to as a "one-way direction," while a direction not particularly indicating a progress or a regress along a line connecting the starting point and the end point of an arrow will be referred to as a "wayless direction" as needed.

In the following description, a vertical (i.e., an up-down) direction is defined with respect to a state in which an MFP (multi-functional peripheral) 10 is installed ready for use (i.e., the state shown in FIG. 1), a front-rear direction 8 is defined with a surface on which an opening 13 is formed being a front surface 23, and a right-left direction is defined and a right-left direction is defined based in accordance with a right-hand side and a left-hand side of the MFP 10 when viewing from the front side. The up-down direction 7, the front-rear direction 8, and the right-left direction 9 are orthogonal to each other.

Overall Configuration of MFP

As shown in FIG. 1, the MFP 10 has a housing 14 that has a substantially rectangular parallelepiped shape. It is noted that the MFP 10 is an example of a liquid ejection device. On a lower side of the housing 14, a printer engine 11 is provided. The MFP 10 has various functions including a facsimile function and a print function. As the print function, the MFP 10 has a function of recording an image on one side of a printing sheet 12 in accordance with an inkjet printing method (see FIG. 2). It is noted that the MFP 10 may be configured to form images on respective sides of the printing sheet 12. On an upper side of the housing 14, an operation panel 17 is provided. It is noted that the operation panel 17 is an example of an inputting device. The operation panel 17 is provided with buttons to be operated for instructing recordation of images and/or performing various settings, and an LCD 31 is configured to display various information. It is noted that the LDC 31 is an example of a displaying device. In the MFP 10 according to the present disclosures, the operation panel 17 is configured by a touch panel having functions of the buttons and the LCD 31.

As shown in FIGS. 2-5, the printer engine 11 is equipped with a sheet feed tray 20, a sheet conveyor 16, an outer guide member 18, an inner guide member 19, a conveying roller pair 59, a discharging roller pair 44, a platen 42, a recorder 24, a cap 70, a solenoid valve 92, a rotary encoder 75 (see FIG. 6), a controller 130 (see FIG. 6), and a memory 140 (see FIG. 6), which are arranged inside the housing 14. In addition to the above, various status sensors, each of which is configured to detect a state of the MFP 10 and output a signal corresponding to a detected result, are provided inside the housing 14. Concretely, the MFP 10 according to the present disclosures is equipped with a tray sensor 110, a cap sensor 147, a cover sensor 150, an encoder 35 (see FIG. 6), a liquid level sensor 155, and a sheet sensor 120. It is noted that the status sensors are not necessarily limited to ones described above, but may optionally or alternatively have sensors provided to publicly-known MFPs.

Sheet Feed Tray

As shown in FIG. 1 and as mentioned above, the opening 13 is formed on the front surface 23 of the printer engine 11. The sheet feed tray 20 is configured to be removed or inserted with respect the housing 14 through the opening 13 by moving the sheet feed tray 20 in a front direction or a rear direction. The sheet feed tray 20 is configured to be moved between a feeding position at which the sheet feed tray 20 is attached to the housing 14 and a non-feeding position corresponding to a position of the sheet feed tray 20 which is removed from the housing 14.

Figure 2:
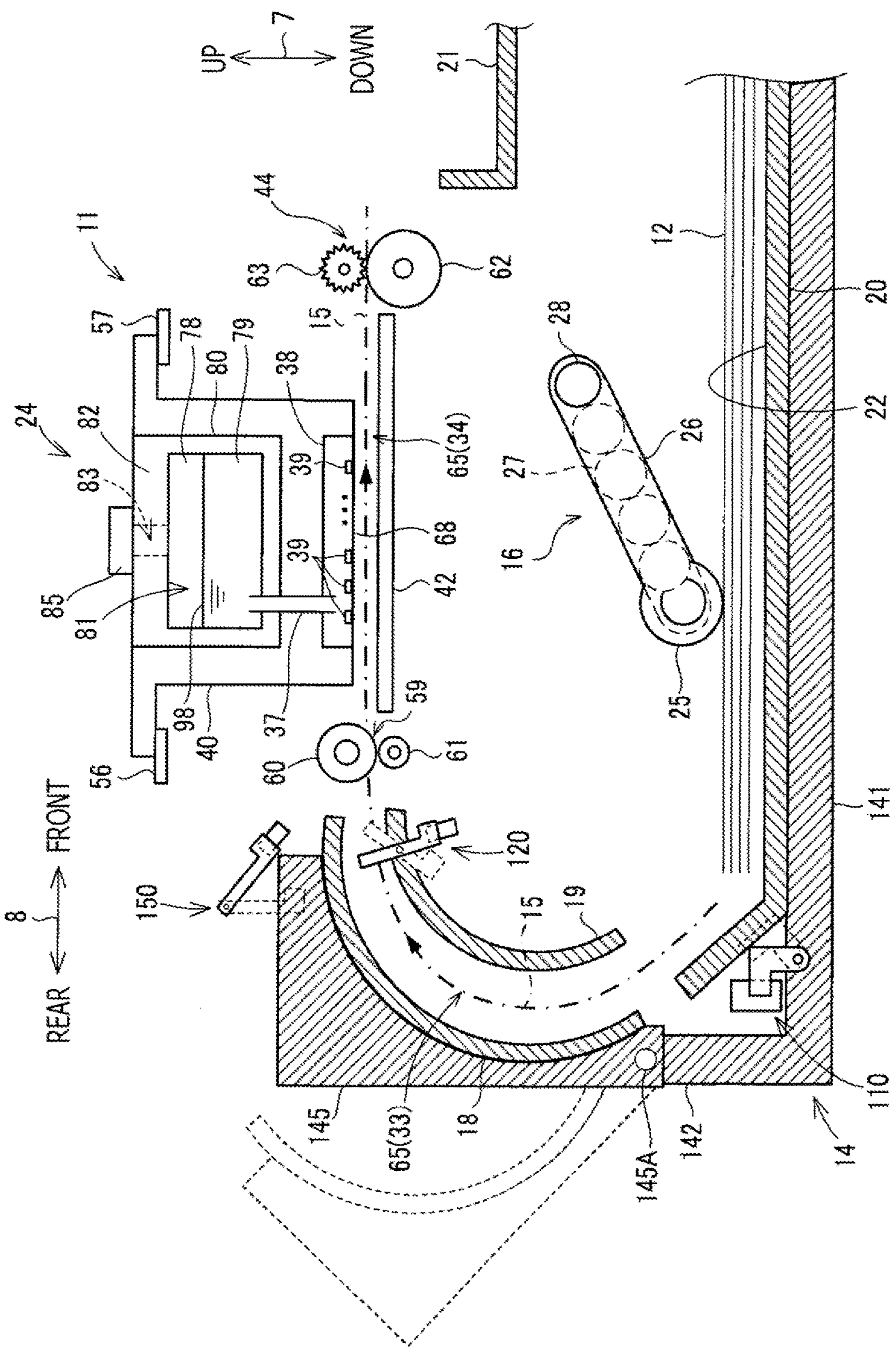
FIG. 2 is a cross-sectional side view schematically showing an inner configuration of a printer engine.

The sheet feed tray 20 is a box-shaped member of which upper side is opened and configured to accommodate the printing sheets 12. As shown in FIG. 2, the printing sheets 12 are supported on a bottom plate 22 of the sheet feed tray 20 in a stacked manner. Above a front portion of the sheet feed tray 20 attached to the housing 14, a sheet discharge tray 21 is provided. The discharged printing sheets 12 on which images are formed by the recorder 24 are supported on the discharge tray 21.

As shown in FIG. 2, when the sheet feed tray 20 is located at the feeding position, the printing sheets 12 supported by the sheet feed tray 20 can be conveyed to a conveying path 65.

Inside the housing 14, at a lower rear portion, a tray sensor 110 is provided. The tray sensor 110 is supported on a lower wall 141 of the housing 14. The tray sensor 110 is a sensor configured to detect whether the sheet feed tray 20 is located at the feeding position. It is noted that the tray sensor 110 is not necessarily limited to the above-described one but a well-known sensor may be used instead.

Sheet Conveyor

As shown in FIG. 2, the sheet conveyor 16 is arranged below the recorder 24 and above the bottom plate 22 of the sheet feed tray 20. The sheet conveyor 16 is provided with a sheet feed roller 25, a sheet feed arm 26, a driving force transmitting mechanism 27, and a shaft 28. The sheet feed roller 25 is rotationally supported at a tip end of the sheet feed arm 26. The sheet feed roller 25 is configured to be driven by a feeding motor 102 (see FIG. 6). The sheet feed roller 25 is configured to feed the printing sheet 12 to the sheet conveying path 65.

Sheet Conveying Path

As shown in FIG. 2, the sheet conveying path 65 extends from a rear-end portion of the sheet feed tray 20. The sheet conveying path 65 has a curved part 33 and a linear part. The curved part is formed to make a U-turn such that it extends upward and then rearward. The linear part 34 extends substantially in the front-rear direction 8.

The curved part 33 is defined by the outer guide member 18 and the inner guide member 19 which face each other with a particular clearance therebetween. The outer guide member 18 and the inner guide member 19 extend in the right-left direction. The linear part 34 is defined, at a position where the recorder 24 is arranged, by the recorder 24 and the platen 42 which face each other with a particular clearance therebetween.

The printing sheets 12 supported by the sheet feed tray 20 are fed by the sheet feed roller 25, one by one, to the conveying roller pair 59 via the curved part 33. The printing sheet sandwiched by the conveying roller pair 59 is conveyed frontward, along the linear part 34, toward the recorder 24. Then, an image is formed on the printing sheet 12, which is conveyed immediately below the recorder 24, by the recorder 24. The printing sheet 12 on which the image is formed is conveyed frontward along the linear part 34 and discharged on the discharge tray 21. As above, the printing sheet 12 is conveyed in a conveying direction 15, which is a one-way direction indicated by arrowed one-dotted lines.

Openable Cover

As shown in FIG. 2, an openable cover 145 is supported such that the openable cover 145 is rotatably supported by a rear wall 142 of the housing 14 so as to be rotatable about a shaft 145A extending in the right-left direction. In the configuration shown in FIG. 2, the shaft 145A is located on a lower end portion of the openable cover 145. However, the location of the shaft 145A is not necessarily limited to the location shown in FIG. 2.

The openable cover 145 is rotatable between a closed position which is indicated by solid lines in FIG. 2, and an opened position indicated by broken lines in FIG. 2. The outer guide member 18 is attached to the openable cover 145. That is, the outer guide member 18 is configured to rotate integrally with the openable cover 145. When the openable cover 145 is located at the closed position, the outer guide member 18 forms the curved part 33. When the openable cover 145 is located at the opened position, the curved part 33 is exposed to the outside of the housing 14. In this configuration, a user can easily remove a jammed printing sheet 12 which is stuck in the sheet conveying path 65.

The cover sensor 150 is arranged in the rear upper part inside the housing 14. The cover sensor 150 is supported by a frame (not shown) of the MFP 10. The cover sensor 150 is a sensor for detecting the location of the openable cover 145. The cover sensor 150 is not necessarily limited to the one described above, but any known sensor can be employed.

Conveying Roller Pair and Discharging Roller Pair

As shown in FIG. 2, the conveying roller pair 59 is arranged in the linear part 34. The discharging roller pair 44 is arranged downstream, in a conveying direction 15, of the conveying roller pair 59, in the linear part 34 in the conveying direction 15.

The conveying roller pair 59 has a conveying roller 60 and a pinch roller 61 arranged below and facing the conveying roller 60. The pinch roller 61 is urged against the conveying roller 60 by an elastic member such as a coil spring (not shown). The conveying roller pair 59 is capable of sandwiching the printing sheet 12.

The discharging roller pair 44 includes a discharging roller 62 and a spur roller 63 which is arranged above the discharging roller 62 to face the same. The spur roller 63 is urged toward the discharging roller 62 by an elastic member (not shown) such as a coil spring. The discharging roller pair 44 is configured to sandwich the printing sheet 12 between the discharging roller 62 and the spur roller 63.

The conveying roller 60 and the discharging roller 62 are configured to receive the driving force from a conveying motor 101 (see FIG. 6) and rotate. When the conveying roller 60 rotates with the printing sheet 12 being sandwiched by the conveying roller pair 59, the printing sheet 12 is conveyed by the conveying roller pair 59 in the conveying direction 15 toward the platen 42. When the discharging roller 62 rotates with the printing sheet 12 being sandwiched by the discharging roller pair 44, the printing sheet 12 is conveyed by the discharging roller pair 44 in the conveying direction 15 onto the discharge tray 21. It is noted that a single common motor may be used as the conveying motor 101 and the feeding motor 102. In such a case, drive force transmitting paths from the common motor may be configured to be switched.

Platen

As shown in FIG. 2, the platen 42 is arranged in the linear part 34 of the sheet conveying path 65. The platen 42 faces, in the up-down direction 7, the recorder 24. The platen 42 is configured to support the printing sheet 12 conveyed in the sheet conveying path 65 from below.

The printing sheet 12 conveyed in the sheet conveying path 65 passes, in the right-left direction, through a medium passage area 36 of the platen 42 (see FIGS. 3-6).

Recorder

As shown in FIG. 2, the recorder 24 is arranged above the platen 42 to face the platen 42. The recorder 24 includes a carriage 40, a head 38, a reservoir 80 and a liquid level sensor 155 (see FIGS. 3-6). It is noted that the liquid level sensor 155 is an example of a detector according to aspects of the present disclosures.

The carriage 40 is supported so as to be movable in the right-left direction 9 orthogonal to the conveying direction 15 by two guide rails 56 and 57 which are arranged in parallel and spaced in the front-rear direction. The carriage 40 is configured to move, in the right-left direction, from the right side with respect to the medium passage area 36 to the left side with respect to the medium passage area 36. It is noted that the movable direction of the carriage 40 is not necessarily limited to the right-left direction 9, but can be any direction intersecting with the conveying direction 15.

The guide rail 56 is arranged upstream of the head 38 in the conveying direction 15, and the guide rail 57 is arranged downstream of the head 38 in the conveying direction 15. The guide rails 56 and 57 are supported by a pair of side frames (not shown) arranged outside the linear part 34 of the sheet conveying path 65 in the right-left direction 9. The carriage 40 is configured to move as the driving force is applied from a carriage driving motor 103 (see FIG. 6).

An encoder is provided to the guide rail 56 or the guide rail 57. The encoder 35 has an encoder strip extending in the right-left direction 9 and an optical sensor on the carriage 40 at a point facing the encoder strip. The encoder strip has a pattern of light-transmitting and light-blocking areas alternating at equal pitch in the right-left direction 9. The pulse signal is detected as the optical sensor detects the light-transmitting and light-blocking areas. The pulse signal is a signal corresponding to the position of the carriage 40 in the right-left direction 9. The pulse signal is output to the controller 130.

As shown in FIGS. 2-5, the head 38 is supported by the carriage 40. A bottom surface 68 of the head 38 is exposed to the downside and faces the platen 42. The head 38 has multiple nozzles 39, an ink channel 37, and piezoelectric elements 45 (see FIG. 6). It is noted that the piezoelectric element 45 is an example of an element according to aspects of the present disclosures.

The multiple nozzles 39 are spaced apart and aligned on the bottom surface 68 of the head 38. The multiple nozzles 39 are opened at the bottom surface 68. The multiple nozzles 39 are configured to face the platen 42 and the printing sheet 12 supported by the platen 42.

Each piezoelectric element 45 is an actuator that deforms a portion of the ink channel 37. The piezoelectric element 45 is driven in response to a drive signal supplied by the controller 130. The piezoelectric element 45 changes the volume of a liquid channel 91 (see FIG. 10) that is connected to the nuzzle 39, thereby causing the nozzle 39 to eject the ink droplet downward. The ink channel 37 connects the reservoir 80 to the multiple nozzles 39.

Figure 3:
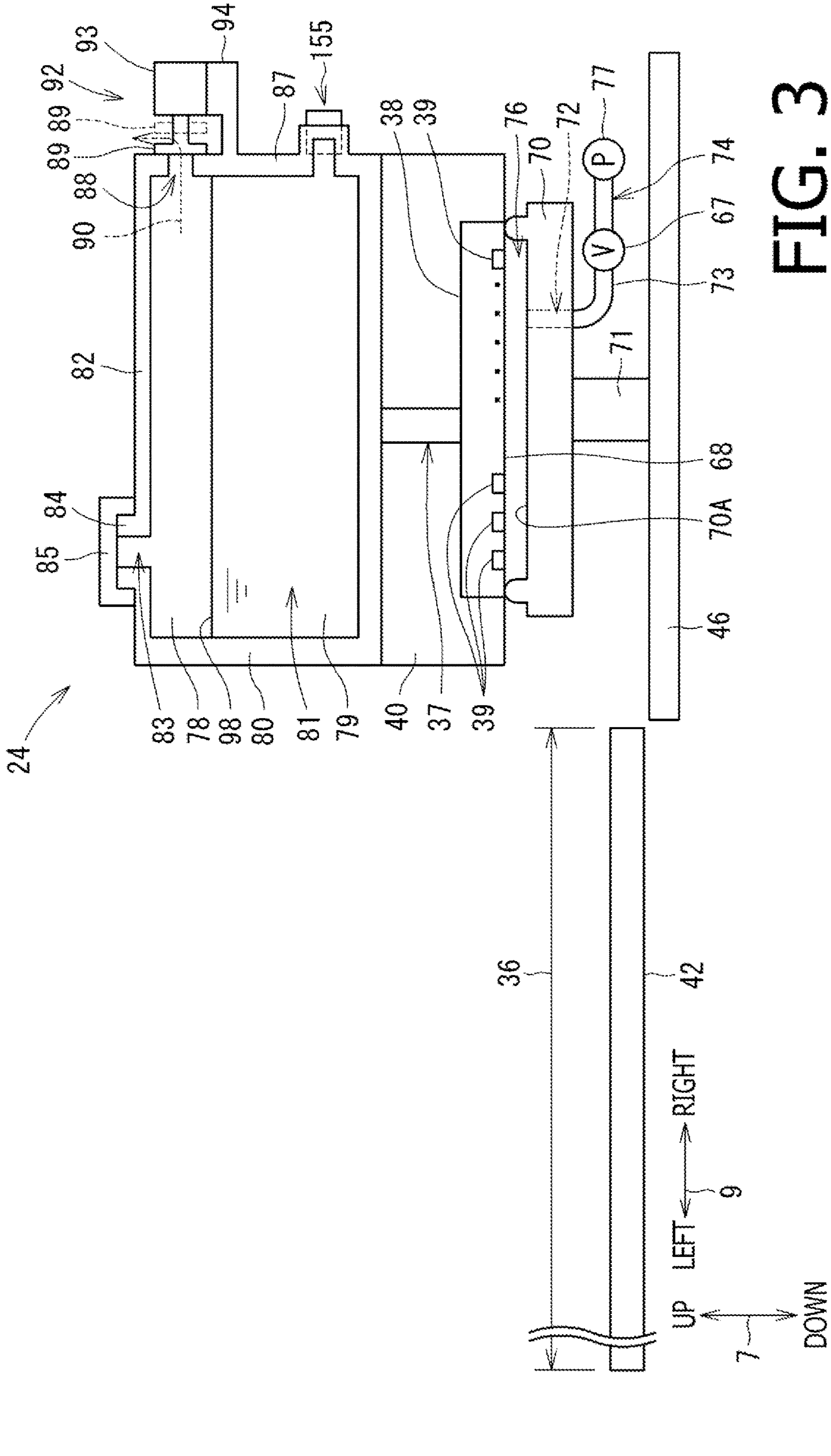
FIG. 3 is a longitudinal sectional view showing a platen and a recording engine taken in a plane perpendicular to a front-back direction, when a carriage is located at a maintenance position and a cap is located at a covering position.
Figure 4:
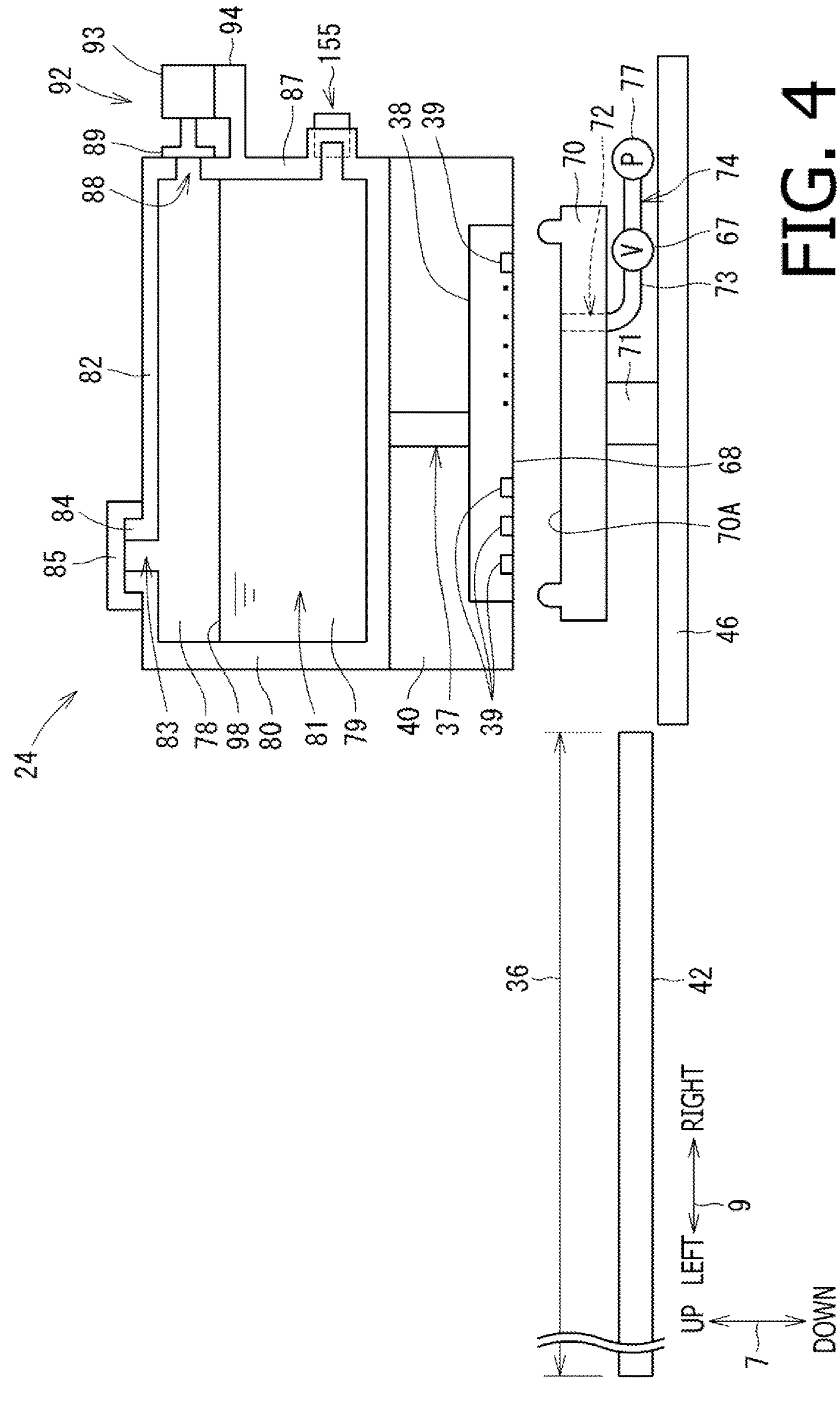
FIG. 4 is a longitudinal sectional view showing the platen and the recording engine taken in the plane perpendicular to the front-back direction, when the carriage is located at the maintenance position and the cap is located at a spaced position.
Figure 5:
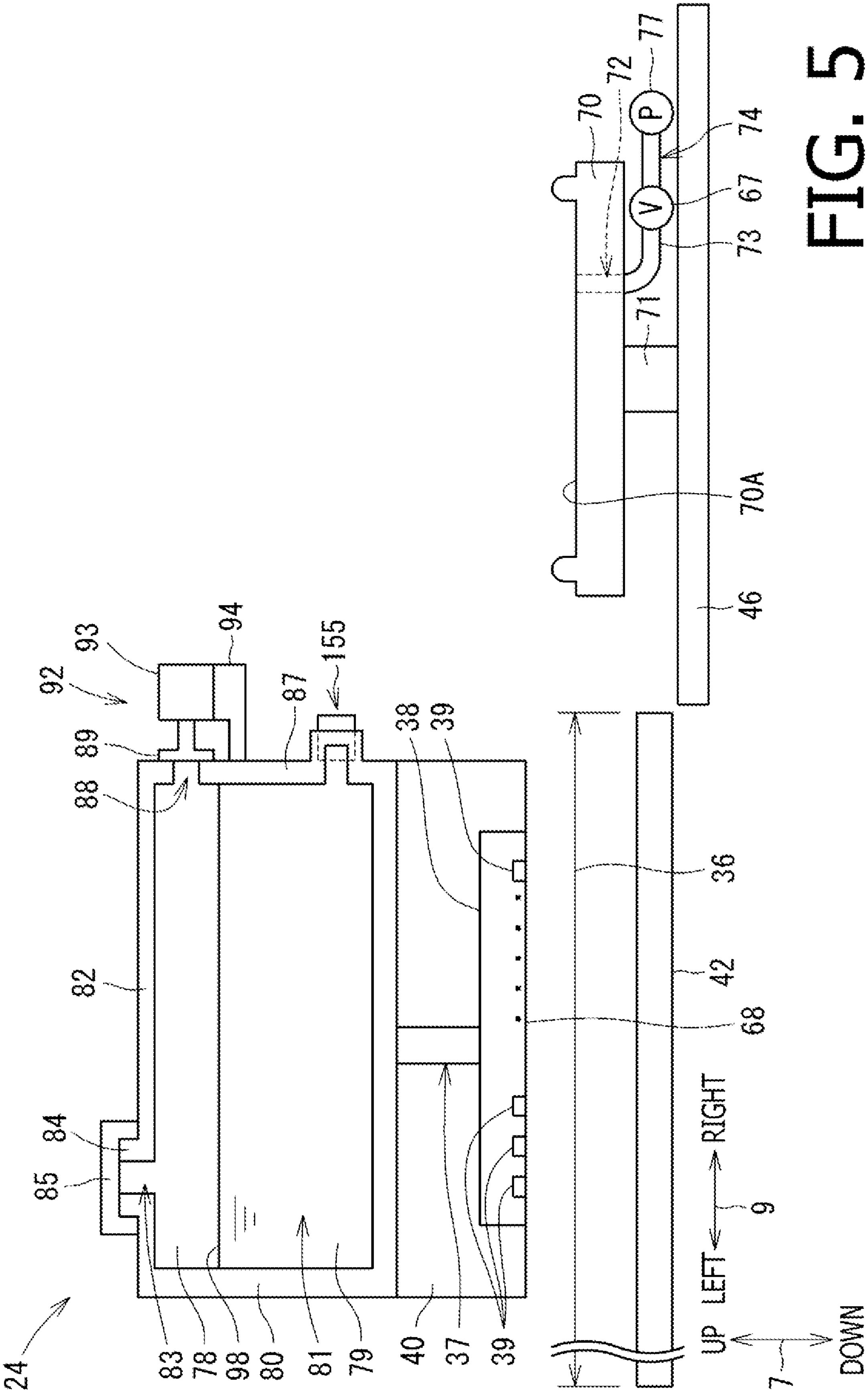
FIG. 5 is a longitudinal sectional view showing the platen and the recording engine taken in the plane perpendicular to the front-back direction, when the carriage is located above a media passing area and the cap is located at the spaced position.

As shown in FIGS. 3-5, the reservoir 80 is supported by the carriage 40 in an installed state. The reservoir 80 has an internal space 81. In the internal space 81, the ink is stored with the liquid level 98 being formed. The internal space 81 is divided into a gas layer 78 and an ink layer 79 by the liquid level 98 of the ink. The recorder 24 has a single reservoir 80. In the single reservoir 80, black ink is stored. It is noted that the color of the ink stored in the reservoir 80 is not necessarily limited to black, and the color may be cyan, magenta yellow or the like.

The reservoir 80 is arranged at a higher level than the head 38. Although the entire part of the reservoir 80 is arranged at a higher level than the head 38 according to the present disclosures, it is sufficient that the liquid level 98 of the maximum storable quantity of the ink is higher than the opening of the nozzle 39.

The internal space 81 of the reservoir 80 communicates with the multiple nozzles 39 through the ink channel 37.

An inlet 83 for injecting ink into the internal space 81 is provided on the upper wall 82 of the reservoir 80. The inlet 83 penetrates the upper wall 82 in a direction of thickness and connects the internal space 81 to the outside of the reservoir 80. As shown in FIGS. 3 through 5, a protruding wall 84 is provided around the inlet 83 on the top surface of the upper wall 82. As a lid 85 is fitted onto the protruding wall 84, the inlet 83 is closed. When the lid 85 is removed from the protruding wall 84, the inlet 83 is exposed to the outside. In this state, a bottle (not shown) is inserted into the inlet 83, and the ink is injected from the bottle into the internal space 81 through the inlet 83. The inlet 83 may be provided on a position other than the upper wall 82, as long as the inlet 83 connects the top of the internal space 81 to the outside.

The liquid level sensor 155 is a sensor for detecting whether a liquid level 98 in the internal space 81 of the reservoir 80 is below a particular position. The liquid level sensor 155 is arranged at a lower portion of a side wall 87 of the reservoir 80. The liquid level sensor 155 outputs a high-level signal when the liquid level 98 drops to a detection position (indicated by broken lines in FIG. 3) near the ink channel 37 in the internal space 81 of the reservoir 80. The liquid level sensor 155 outputs a low-level signal when the liquid level 98 is above the detection position. When the liquid level 98 is below the detection position, a condition of the reservoir 80 is determined to be near-empty or empty. It is noted that the liquid level sensor 155 is not necessarily limited to the one described above, but any known liquid level sensor can be employed.

An air vent 88 is provided on the side wall 87 of the reservoir 80. The air vent 88 connects a gas layer 78 of the reservoir 80 to the outside. A solenoid valve 92 is provided near the air vent 88. As the solenoid valve 92, a known solenoid valve can be used.

The solenoid valve 92 has a valve 89 and a solenoid 93 configured to move the valve 89. The solenoid 93 is supported by a support stand 94 on the side wall 87. The valve 89 is supported by the solenoid 93 so as to move along the right-left direction 9 with respect to the solenoid 93. As an electric current is applied to a coil disposed in the solenoid 93, the valve 89 moves in the right-left direction 9. As shown by solid lines in FIG. 3, with the valve 89 protruding leftwardly relative to the solenoid 93, the valve 89 is in the closed position, where the valve 89 contacts the air vent 88 and closes the air vent 88. As shown in FIG. 3, when the protruding length of the valve 89 with respect to the solenoid 93 is shorter than that when the valve 89 is located at the closed position where the valve 89 is separated from the air vent 88 and opens the air vent 88. At this time, an air channel 90 is formed that connects the gas layer 78 of the reservoir 80 to the outside. In other words, the air channel 90 has the air vent 88.

Cap

As shown in FIGS. 3-5, a cap 70 is located outside the platen 42 in the right-left direction, at a maintenance position (a position shown in FIGS. 3 and 4) with respect to the medium passing area 36 in this embodiment. When the carriage 40 is located at the maintenance position, the cap 70 is located below the carriage 40 and faces the carriage 40, specifically, the nozzles 39 of the head 38. The cap 70 is a box-like member of which upper side is open.

Figure 6:
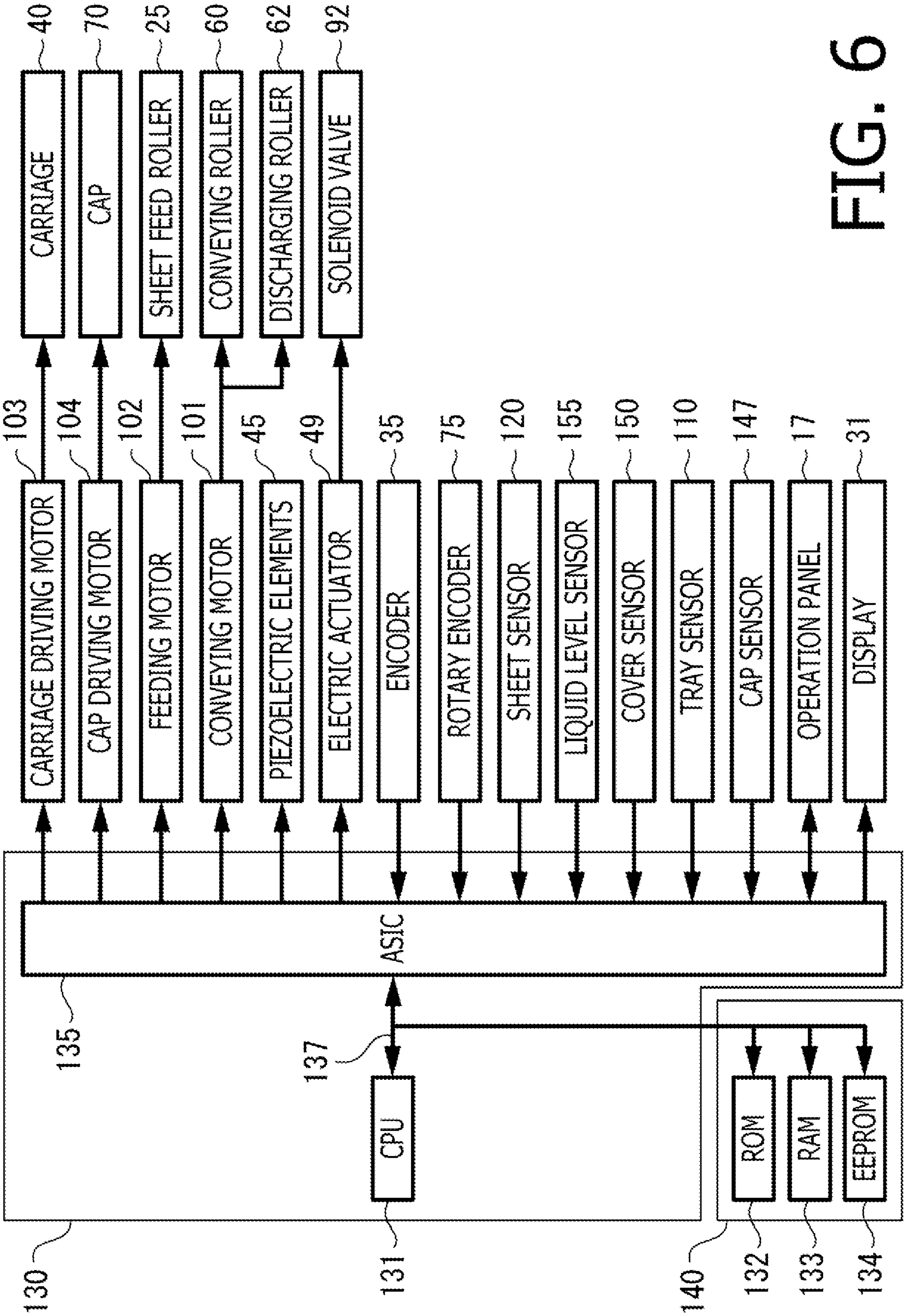
FIG. 6 is a functional block diagram of the MFP.

The cap 70 is supported on the frame 46 via a known moving mechanism 71 and is configured to move up and down by the moving mechanism 71, which is driven by a cap driving motor 104 (see FIG. 6). A position of the cap 70 is detected by the cap sensor 147 (see FIG. 6).

The cap 70 is configured to move between a covering position, where the cap 70 covers the nozzle 39, as shown in FIG. 3, and a separated position, where the cap 70 is separated from the nozzles, as shown in FIG. 4. As shown in FIG. 3, when the cap 70 is located at the covered position, a top end of the cap 70 is pressed against the bottom surface 68 of the head 38 from below. As a result, the cap 70 is in a state where the cap 70 covers, from below, the plurality of nozzles 39 that are opened on the bottom surface 68. In this state, a cap internal space 76 is formed, which is defined by the cap 70 and the bottom surface 68 of the head 38. The separated position is a position below the covering position. When the cap 70 is located at the separated position, the cap 70 is separated from the bottom surface 68 of the head 38.

On a bottom surface 70A of the cap internal space 76 (i.e., a top surface of the cap 70), a through-hole 72 that communicates between the cap internal space 76 of the cap 70 and the outside. One end of the tube 73 is connected to the through-hole 72. The tube 73 is a flexible plastic tube. When one end of the tube 73 is connected to the through-hole 72, the cap internal space 76 and the outside are connected to form a cap communication passageway 74. The other end of the tube 73 is connected to a cap valve unit 67 which makes the through-hole 72 or the cap communication passageway 74 in a communicated state or non-communicated state. The cap valve unit 67 makes the through-hole 72 or the cap communication passageway74 in the communicated state in which the cap internal space 76 communicates with the outside or in the non-communicated state in which the cap internal space 76 is blocked from the outside.

The cap internal space 76 is connected to the pump 77. The pump 77 applies a suction pressure to the cap internal space 76 of the cap. When the pump 77 is driven when the cap 70 is located in the covering position and covers the nozzles 39, and when the cap valve unit 67 is in the non-communicated state, the cap internal space 76 becomes in a negative pressure, and foreign substances are sucked out from the nozzles 39 together with ink into the cap internal space 76.

Sheet Sensor

As shown in FIG. 2, the sheet sensor 120 is arranged upstream, in the conveying direction 15, with respect to the conveying roller pair 59 in the conveying path 65. The sheet sensor 120 is a sensor for detecting the presence or absence of 12 printing sheets at an installation position. The sheet sensor 120 is not limited to the one described above, but any known sheet sensor can be employed.

Rotary Encoder

A rotary encoder 75 includes an encoder disk and an optical sensor. When the encoder disk rotates, pulse signals are generated by the optical sensor, and the pulse signals are output to the controller 130.

Controller and Memory

Referring to FIG. 6, configurations of the controller 130 and the memory 140 will be described. The controller 130 performs the process according to a flowchart described below. The controller 130 controls the overall operation of the MFP 10. The controller 130 has a CPU 131 and an ASIC 135. The memory 140 has a ROM 132, a RAM 133, and an EEPROM 134. The CPU 131, the ASIC 135, the ROM 132, the RAM 133, and the EEPROM 134 are connected by an internal bus 137.

The ROM 132 contains programs and other data for the CPU 131 to control various operations. The RAM 133 is used as a storage area to temporarily store data, signals, and the like used by the CPU 131 in executing the above program, or as a work area for data processing. The EEPROM 134 stores settings, flags, and a correspondence table that should be retained after the power is turned off. The correspondence table is an example of a table.

The correspondence table is stored in the memory 140 in advance as data for deriving the drive signal that optimally drives the piezoelectric element 45 based on the quantity of ink stored in the reservoir 80. In the correspondence table, for example, a pulse wave P1 corresponds to an ink quantity Q1, and a pulse wave P2 corresponds to an ink quantity Q2. The ink quantity Q2 is smaller than the ink quantity Q1. The pulse wave P2 has a longer waveform duration than the pulse wave P1 (see FIGS. 9A, 9B and 9C). In the correspondence table, the pulse waves P3, P4, . . . , may further be associated with the ink quantities Q3, Q4, . . . , respectively.

In the correspondence table, the drive signals are defined in correspondence with ink colors, respectively, and the controller 130 is configured to output different drive signals in accordance with the ink colors. The controller 130 is configured to output the drive signals corresponding to the ink colors and ink quantities.

The controller 130 is configured to count the quantity of ink ejected from the multiple nozzles 39 from a point of time when the maximum quantity of ink is stored in the reservoir 80. Counting of ink quantities is performed based on the print data and other data. This count of ink quantity will be referred to as a count value. The count values are stored in the EEPROM 134, for example. The controller 130 resets the count value in response to the user refilling the reservoir 80 and the operation panel 17 receiving an input that the reservoir 80 has been refilled with the maximum quantity of ink. It is noted that the count value may be rewritten by the controller 130 according to the quantity of ink.

To the ASIC 135, the feeding motor 102, the feeding motor 102, the carriage driving motor 103, and the cap driving motor 104 are connected. The ASIC 135 is equipped with drive circuits that control the respective motors. The CPU 131 outputs drive signals to rotate the motors to the drive circuits corresponding to the motors, respectively. The drive circuits output drive currents to the corresponding motors in response to drive signals obtained from the CPU 131. In this way, the corresponding motors rotate. That is, the controller 130 controls the feeding motor 102 to cause the sheet conveyor 16 to feed the 12 printing sheets. The controller 130 also controls the conveying motor 101 to cause the conveying roller pair 59 and the discharging roller pair 44 to convey the printing sheets 12. The controller 130 controls the carriage driving motor 103 to move the carriage 40. The controller 130 controls the cap driving motor 104 to cause the moving mechanism 71 to move the cap 70.

To the ASIC 135, the tray sensor 110 is connected. When obtaining a low-level signal from the tray sensor 110, the controller 130 detects that the feed tray 20 is located at the feeding position. On the other hand, when obtaining a high-level signal from the tray sensor 110, the controller 130 detects that the feed tray 20 is not located at the feeding position.

To the ASIC 135, the cap sensor 147 is connected. Based on output from the cap sensor 147, the controller 130 detects that a position of the cap 70, e.g., a capped position and a uncapped position.

To the ASIC 135, the cover sensor 150 is connected. When obtaining a low-level signal from the cover sensor 150, the controller 130 detects the openable cover 145 is located at the closed position. On the other hand, when obtaining a high-level signal from the cover sensor 150, the controller 130 detects that the openable cover 145 is located at the opened position.

To the ASIC 135, the sheet sensor 120 is connected. When obtaining a high-level signal from the sheet sensor 120, the controller 130 detects that there exists the printing sheet 12 at an arranged position of the sheet sensor 120. On the other hand, when obtaining a low-level signal from the sheet sensor 120, the controller 130 detects that there exists no printing sheet 12 at the arranged position of the sheet sensor 120.

To the ASIC 135, the optical sensor of the rotary encoder 75. The controller 130 is configured to calculate a rotation amount of the conveying motor 101 based on an electrical signal received from the optical sensor of the rotary encoder 75.

The controller 130 recognizes the location of the printing sheet 12 based on the amount of rotation of the conveying motor 101 after the electrical signal received from the sheet sensor 120 changes from a low level to a high level (i.e., after detecting that the leading edge of the printing sheet 12 has reached the position where the sheet sensor 120 is arranged).

To the ASIC 135, the liquid level sensor 155 is connected. When obtaining a low-level signal from the liquid level sensor 155, the controller 130 detects that the liquid level 98 of the ink stored in the reservoir 80 is higher than a detection position. On the other hand, when obtaining a high-level signal from the liquid level sensor 155, the controller 130 detects that the liquid level 98 of the ink stored in the reservoir 80 is equal to or lower than the detection position. The controller 130 is configured to start counting the quantity of the ink ejected from the multiple nozzles 39. The counting of the quantity of the ink is performed based on the print data and the like. This counting of the quantity of the ink will be referred to as an empty count value. For example, the empty count value is stored in the EEPROM 134. The controller 130 determines a state of the reservoir 80 to be empty in response to the empty count value reaching a particular threshold value. The controller 130 stops ejecting the ink from the nozzles 39 on condition that the state of the reservoir 80 is determined to be empty. The threshold for determining the empty state is set in advance, corresponding to the position where the liquid level 98 of the reservoir 80 is lower than the detection position but does not reach the ink channel 37.

To the ASIC 135, the encoder 35 is connected. The controller 130 is configured to recognize the location of the carriage 40 and whether the carriage 40 is moving or not based on the pulse signal received from the encoder 35.

To the ASIC 135, the piezoelectric elements 45 are connected. The piezoelectric elements 45 operate when powered by the controller 130 via the AISC 135. The controller 130 controls the power supply to the piezoelectric elements 45 to selectively eject ink droplets from the multiple nozzles 39.

To the ASIC 135, the solenoid valve 92 including the valve 89 and the solenoid 93 is connected. The controller 130 moves the valve 89 by supplying power to a coil arranged inside the solenoid 93 via an electric actuator 49.

The controller 130 performs the conveying process for one pass and the printing process for one pass alternately when recording an image on the printing sheet 12.

The conveying process for one pass is a process of causing the conveying roller pair 59 and the discharging roller pair 44 to convey the printing sheets 12 by a particular number of line feeds. The controller 130 controls the conveying motor 101 to cause the conveying roller pair 59 and the discharging roller pair 44 to perform the conveying process.

The printing process for one pass is a process of having the head 38 eject ink droplets from the nozzles 39 by controlling the power supply to the piezoelectric elements 45 while moving the carriage 40 along the right-left direction 9.

The controller 130 stops the conveying of the printing sheets 12 for a particular period of time between the current conveying process and the next conveying process. Then, controller 130 executes the printing process while the printing sheet 12 is stopped. That is, in the printing process, the controller 130 performs a single pass in which ink droplets are ejected from the nozzles 39 while the carriage 40 is moved to the right or to the left. In this way, the image recording for one pass is performed for the printing sheet 12.

The controller 130 is configured to record an image on the entire area of the printing sheet 12 in which the image can be recorded by alternately and repeatedly executing the conveying process and the printing process. In other words, controller 130 records an image on a single sheet of printing sheet 12 with multiple passes.

The controller 130 is not necessarily limited to the above, but may have only the CPU 131 performing various processes, only the ASIC 135 performing the various processes, or the CPU 131 and the ASIC 135 cooperating to perform the various processes. The controller 130 may have a single CPU 131 that performs the processes alone, or multiple CPUs 131 that share the processes. Alternatively, the controller 130 may be a single ASIC 135 that performs the processes alone, or multiple ASICs 135 that share the processes.

Control to Drive Piezoelectric Element with Optimum Pulse Wave

When recording an image, ink droplets 97 are ejected from the nozzles 39. As the quantity of ink ejected increases, the hydraulic head difference between the meniscus formed at an opening of each nozzle 39 and the liquid level 98 also decreases as the quantity of the remaining ink decreases.

Therefore, when the piezoelectric element 45 is driven by a constant drive signal, the quantity of ink ejected from the nozzle 39 decreases.

Under such circumstances, in the printer engine 11 configured as described above, in order to suppress the decrease in the ink discharge quantity, the controller 130 controls the driving of the piezoelectric element 45 with a pulse wave (square wave) corresponding to the difference in the hydraulic head difference between the meniscus formed in the opening of the nozzle 39 and the liquid level 98 to increase the driving amount of the piezoelectric element 45. A pulse wave here refers to a waveform in which the signal level changes from HIGH, LOW, to HIGH over a very short period of time.

Hereinafter, the control by the controller 130 to drive the piezoelectric elements 45 with an optimal pulse wave is described with reference to flowcharts shown in FIG. 7 and FIG. 8. When the power is turned on and the MFP 10 is in a standby state, and a command to start image recording is input from the operation panel 17 by the user, control is initiated to drive the piezoelectric elements 45 with pulse waves optimized for the hydraulic head difference between the meniscus formed in the openings of the nozzles 39 and the liquid level 98. After the image is started to be recorded, the controller 130 starts counting the quantity of ink ejected and obtains the quantity of ink stored in the reservoir 80 based on the counted value.

Figure 7A:
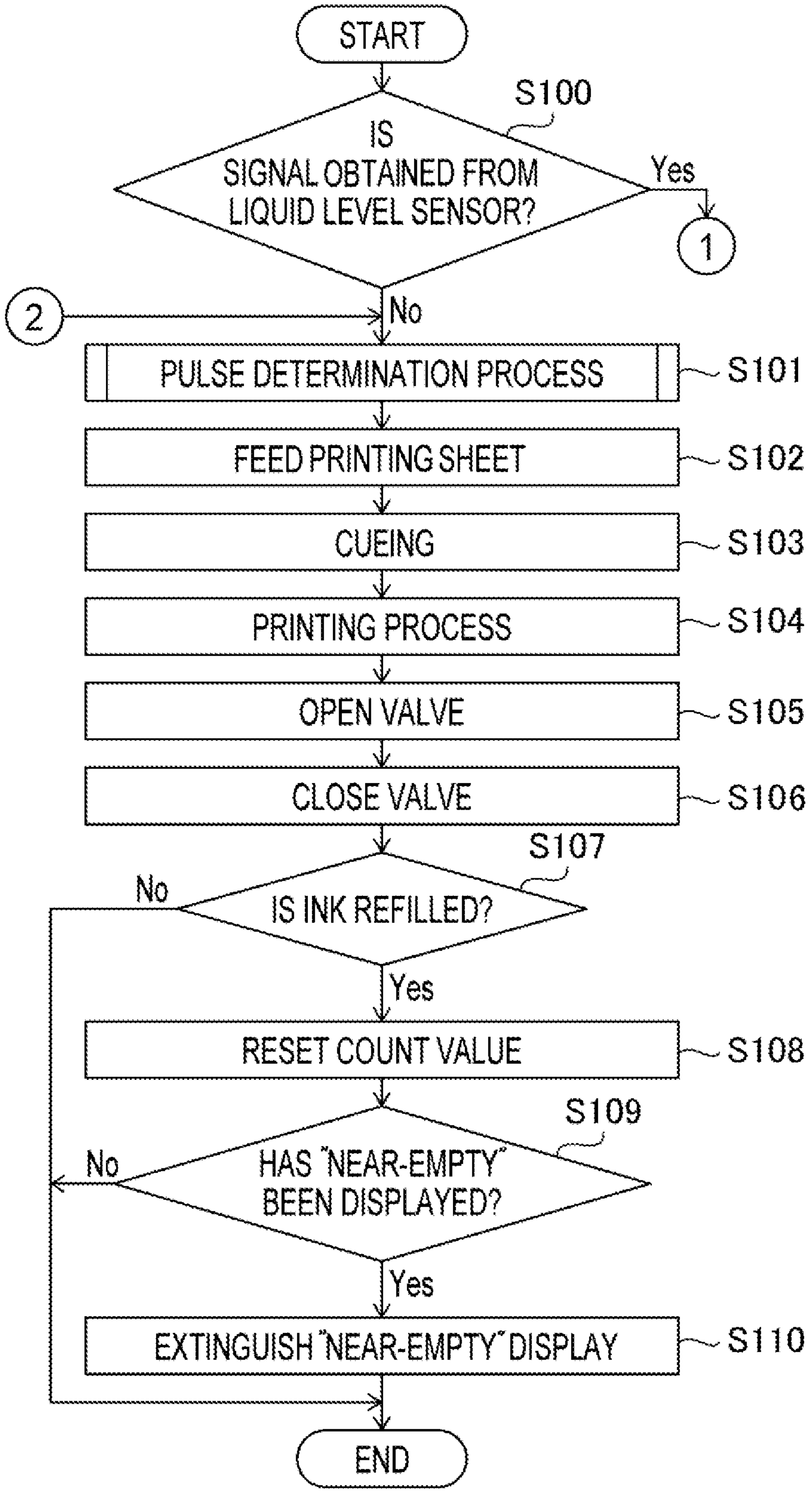
FIGS. 7A and 7B are a flowchart illustrating a control of an ejection quantity of ink ejected from nozzles at a time of image recordation.
Figure 7B:
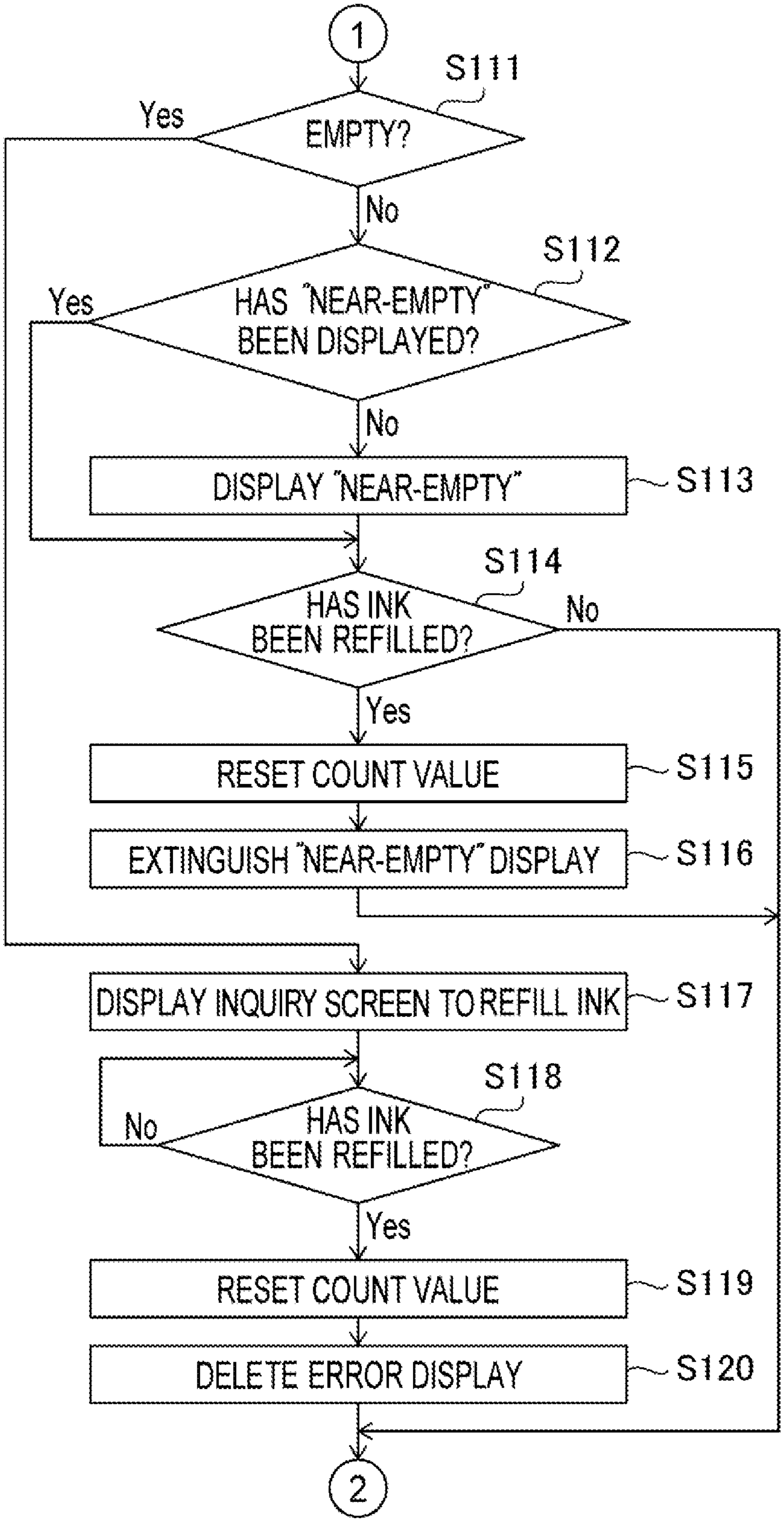

As shown in FIG. 7, the controller 130 executes S100-S120 when the image recording is started.

The controller 130 initially obtains a high-level or low-level signal from the liquid level sensor 155. When the controller 130 obtains the low-level signal from the liquid level sensor 155 (S100: NO), that is, when controller 130 detects that the liquid level 98 of the ink stored in the reservoir 80 is above the detection position, the optimal pulse wave to drive the piezoelectric elements 45 is determined according to a procedure described below (S101).

Next, the controller 130 controls the feeding motor 102 to cause the sheet conveyor 16 to feed the printing sheet 12 (S102). The controller 130 performs a cuing of the printing sheet 12 (S103). In the cuing, the controller 130 stops the printing sheet 12, which is being conveyed in the conveying direction 15, at an image recording start position. The image recording start position is a position where the downstream end of the image recording area in the printing sheet 12 in the conveying direction 15 faces the nozzles 39 located at the most downstream of the conveying direction 15 among the multiple nozzles 39.

The controller 130 executes the printing process by ejecting the ink droplets 97 (S104). The printing process is a process of printing on a single sheet of printing sheet 12 and is executed such that the printing process for one pass and the conveying process for one pass are repeated, as described above. After the printing process for one printing sheet 12, the controller 130 moves the valve 89 from the closed position to the opened position by supplying power to the coil in the solenoid 93 (S105). When the air vent 88 is opened by the valve 89, the pressure in the internal space 81 of the reservoir 80 is in equilibrium with the air pressure. The controller 130 stops supplying power to the coil in the solenoid 93 to move the valve 89 from the opened position to the closed position (S106).

After closing the valve 89, the controller 130 determines whether the ink is refilled (S107). When it is determined that the ink is not refilled (S107: NO), the controller 130 terminates the image processing. On the other hand, when it is determined that the ink is refilled (S107: YES), the controller 130 resets the count value (S108). After resetting the counter, the controller 130 determines whether "near-empty" state has been displayed on the LCD 31 (S109). When it is determined that the "near empty" state has not been displayed (S109: NO), the controller 130 stops the image recording. On the other hand, when the "near-empty" state has been displayed (S109: YES), the controller 130 extinguishes the indication of the "near-empty" state (S110) and terminates the image recording.

When it is determined that the high-level signal is obtained from the liquid level sensor 155 (S100: YES), the controller 130 determines whether the reservoir 80 is in the empty state (S111). The controller 130 determines that the reservoir 80 is empty when the empty count value is larger than the threshold (S111: YES), while the reservoir 80 is not empty when the empty count value is equal to or less than the threshold value (S111: NO).

When it is determined that the reservoir 80 is not in the empty state (S111: NO), the controller 130 determines whether the "near-empty" state has been displayed on the LCD 130 (S112). When the "near-empty" state has not been displayed (S112: NO), the controller 130 displays the "near-empty" state on the LCD 31 (S113). After displaying the "near-empty" state on the LCD 131, or when it is determined in S108 that the "near-empty" state has been displayed (S112: YES), the controller 130 determines whether the ink has been refilled (S114). The controller 130 determines whether the ink has been refilled or not based on whether the user has input to the operation panel 17 that the ink has been refilled. When it is determined that the ink has not been refilled to the reservoir 80 (S114: NO), the controller 130 determines the optimum pulse wave to drive the piezoelectric elements 45 (S101). On the other hand, when it is determined that the ink is refilled into the reservoir 80 (S114: YES), the controller 130 resets the count value (S115). After resetting the counter value and the empty count value, the controller 130 extinguishes the "near-empty" display (S116) and determines the optimal pulse wave to drive the piezoelectric elements 45 (S101).

When it is determined that the reservoir 80 is in the empty state (S111: YES), that is, when it is determined that the signal detected by the liquid level sensor 155 is the high-level signal, the controller 130 interrupts the printing and displays an inquiry screen to refill the ink on the LCD (S117). After displaying the inquiry of the ink refill for the user, the controller 130 determines whether the ink has been refilled (S118). When it is determined that the ink has not been refilled to the reservoir 80 (S118: NO), the controller 130 continues to determine whether the ink has been refilled. When the ink is refilled to the reservoir 80 and the user input indicating that the ink has been refilled is input to the operation panel 17 (S118: YES), the controller 130 resets the count value and the empty count value (S119). After resetting the count value and the empty count value, the controller 130 deletes an error display, which is the ink refill requesting display (S120), and determines the optimum pulse wave for driving the piezoelectric elements 45.

Next, a pulse determination process (S101) shown in FIG. 7 will be described in detail with reference to FIG. 8.

When a low-level signal is obtained from the liquid level sensor 155 in S100, when the near-empty indication is cleared in S116, or when the ink refill error indication is cleared in S120, the controller 130 determines the pulse wave to drive the piezoelectric elements 45 (S101).

Figure 8:
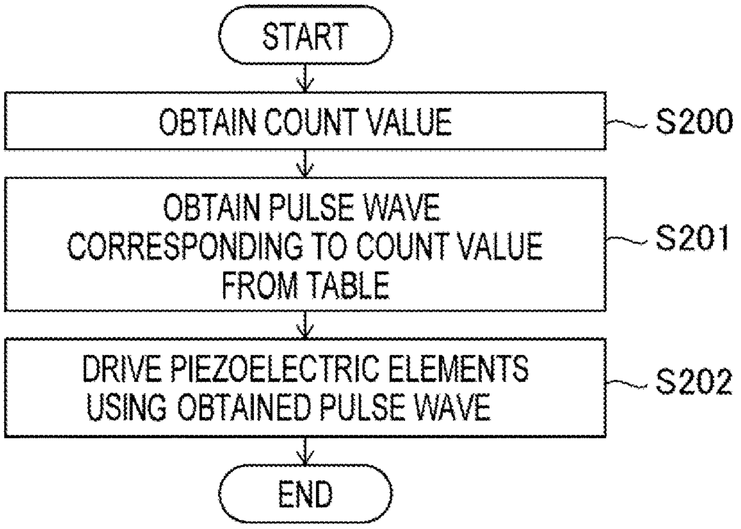
FIG. 8 is a flowchart illustrating determination of a drive signal for driving a piezoelectric element.

As shown in FIG. 8, the controller 130 first obtains the current count value from the EEPROM 134 (S200) to determine the optimal pulse wave to drive the piezoelectric elements 45 corresponding to the quantity of ink in the reservoir 80. Next, the controller 130 refers to the correspondence table stored in the memory 140 in advance and obtains the pulse wave corresponding to the obtained count value (S201). The controller 130 drives the piezoelectric elements 45 using the obtained pulse wave as a drive signal (S202). The above procedure completes the determination of the pulse wave to drive the piezoelectric elements 45.

Pulse Wave of Drive Signal

The drive signal output by the controller 130 to drive the piezoelectric elements 45 is a pulse wave. The pulse wave of the drive signal to drive the piezoelectric elements 45 will be described below with reference to FIGS. 9A-9C and FIG. 10. In this embodiment, only the pulse wave for ejecting a predetermined quantity of ink droplet 97 is explained, but the pulse wave may be determined for each of a plurality of ink droplets 97 with different ejection quantities.

Figure 9A:
FIG. 9A shows a pulse wave when the ink is not ejected.

The pulse wave when no ink is ejected from nozzle 39 is a constant voltage of V1 volts, as shown in FIG. 9A.

Figure 9B:
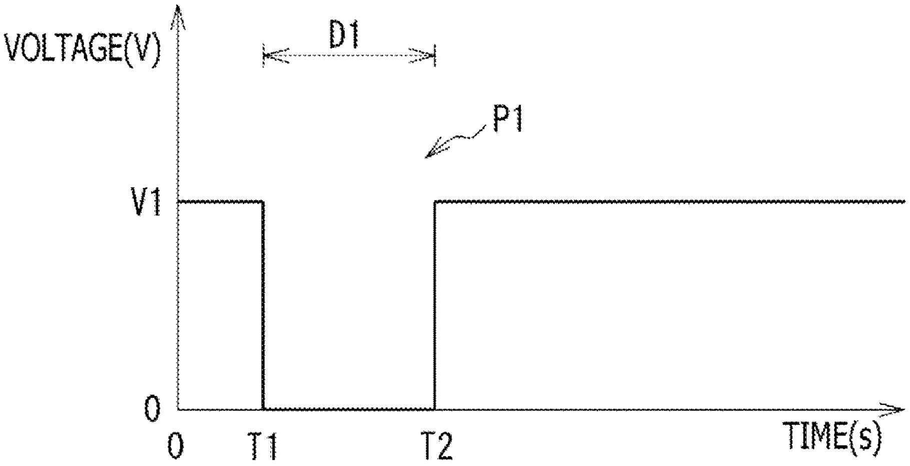
FIG. 9B shows the pulse wave before the drive signal for the piezoelectric element is changed in accordance with a remaining quantity of the ink.
Figure 10:
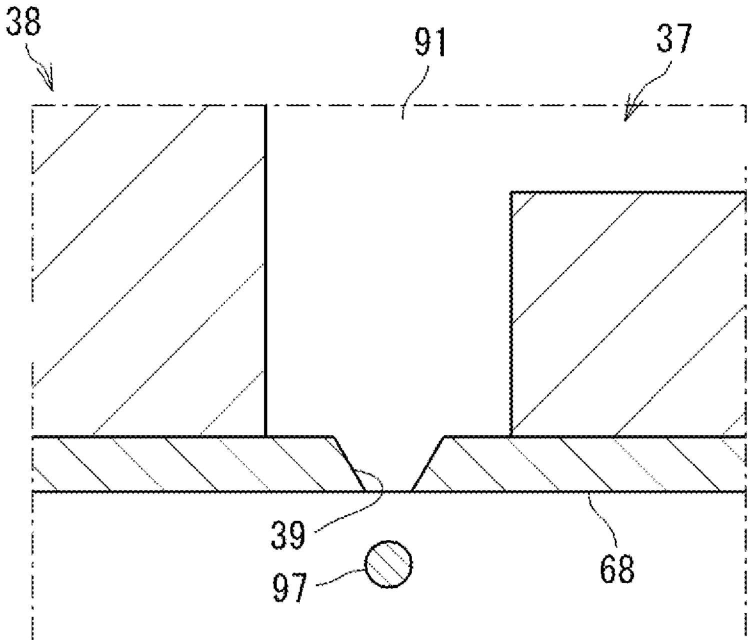
FIG. 10 is an enlarged sectional view of a nozzle and an ink channel showing an ink droplet when the pulse wave is in sates shown in FIG. 9B and FIG. 9C.

When a command to start image recording is input by the user via operation panel 17, the controller 130 outputs a drive signal of pulse wave P1 shown in FIG. 9B to the piezoelectric element 45. The hydraulic head difference is maximum at the start of image recording. The pulse wave P1 has a constant voltage of V1 volts from 0 to T1 seconds, 0 volts from T1 to T2 seconds, and returns to V1 volts from T2 seconds onward. As shown in FIG. 10, each time the drive signal of pulse wave P1 is output to the piezoelectric element 45 by the controller 130, the nozzle 39 ejects ink droplet 97 of a fixed size corresponding to the pulse wave.

When the image recording is started and the ink is discharged, the hydraulic head difference between the meniscus of the nozzle 39 and the liquid level 98 decreases in proportion to the quantity of ink ejected.

Figure 9C:
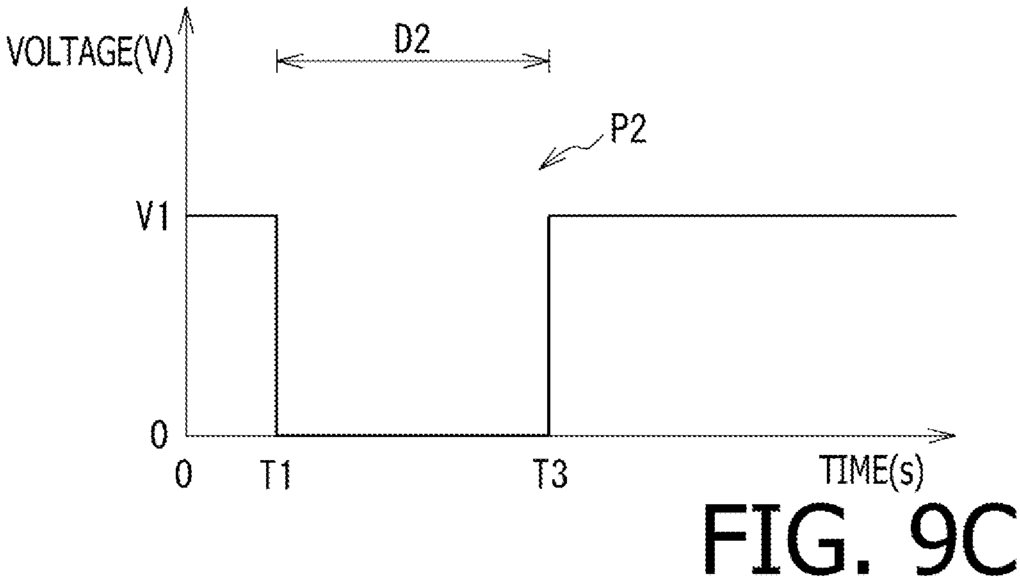
FIG. 9C shows the pulse wave after the drive signal for the piezoelectric element has been changed.

When the controller 130 determines a new pulse wave corresponding to the count value based on the correspondence table, the controller 130 outputs a drive signal of pulse wave P2 shown in FIG. 9C to the piezoelectric element 45. The pulse wave P2 has a constant voltage of V1 volts from 0 to T1 seconds, 0 volts from T1 to T3 seconds, and returns to V1 volts from T3 seconds onward. It is noted that T3 is larger than T2. That is, as shown in FIGS. 9B and 9C, a pulse width D2, which is a separation distance between T1 and T3 of the pulse wave P2, is larger than a pulse width D1, which is a separation distance between T1 and T2 of the pulse wave P1. In this case, if the water head difference between the meniscus of the nozzle 39 and the liquid level 98 is maximum, each time the driving signal of the pulse wave P2 is output to the piezoelectric element 45 by the controller 130, the nozzle 39 ejects an ink droplet 97 larger in size than that of the pulse wave P1. However, the quantity of ink ejected from the nozzle 39 is reduced because the drop of the liquid level 98 reduces the water head difference. As a result, the quantity of ink ejected from the 39 nozzles is the same as in FIG. 10 even when the pulse width is increased, and the ink ejection quantity remains constant.

Effects

According to the present embodiment, the controller 130 obtains the quantity of ink stored in the reservoir 80 and changes the drive signal for the piezoelectric element 45 according to the obtained ink quantity, so that a stable quantity of ink droplets 97 can be ejected from the nozzles 39 even if the ink ejection quantity varies due to fluctuations in the hydraulic head difference between the liquid level 98 in the reservoir 80 and the openings of the nozzles 39.

According to the present embodiment, since the height of the liquid level 98 at the maximum quantity of ink is located higher than the opening of the nozzle 39, the inside of the reservoir 80 does not become negatively pressurized. Even at this time, the quantity of ink droplets 97 ejected from the nozzles 39 is stable because the piezoelectric elements 45 are driven according to the quantity of ink in the reservoir 80.

According to the present embodiment, although ink droplets 97 are ejected and the negative pressure in the reservoir 80 increases with the valve 89 closing the air vent 88 or the air channel 90, the quantity of ink droplets 97 ejected from the nozzle 39 is stable because the piezoelectric elements 45 are driven in accordance with the quantity of ink in the reservoir 80.

Modification 1

In the above embodiment, an example of a pulse wave that can suppress the decrease in the quantity of ink ejected from nozzle 39 and maintain the ink ejection quantity by increasing the pulse width, even if the hydraulic head difference between the meniscus formed at the opening of nozzle 39 and the liquid level 98 becomes small. However, the shape of the wave form is not necessarily limited to the one described above. For example, the pulse wave may be shaped to increase the amplitude of the pulse wave by increasing the voltage to suppress the decrease in the quantity of ink ejected from the nozzle 39 and maintain the ink ejection quantity.

Hereinafter, a pulse wave of the drive signal that drives the piezoelectric elements 45 of the MFP 10 according to a modification 1 will be described with reference to FIG. 11.

In the modification 1, as in the embodiment, the pulse wave has a constant voltage of V1 volts when no ink is ejected from the nozzles 39 (not shown). When the command to start image recording is input by the user via the operation panel 17, the controller 130 outputs a drive signal with the pulse wave P1 to the piezoelectric element 45 (not shown), as in the embodiment.

When the image recording is started and the ink is ejected, the hydraulic head difference between the meniscus formed at the opening of the nozzle 39 and the liquid level 98 becomes small.

Figure 11:
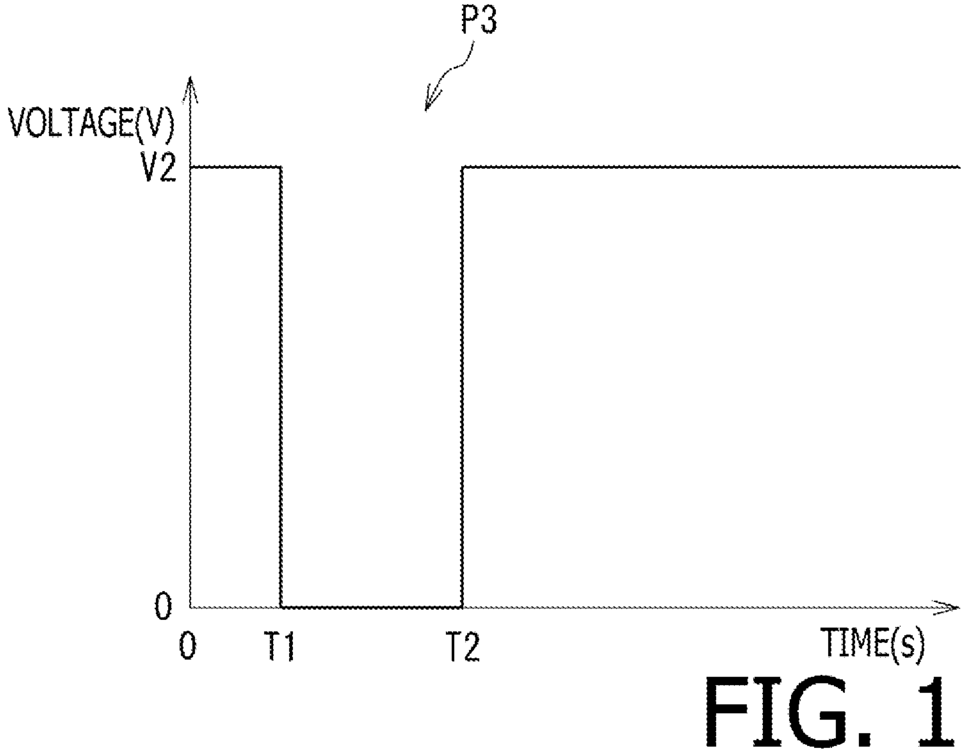
FIG. 11 shows an example of the pulse wave after the drive signal has been changed.

The controller 130 outputs the drive signal with a pulse wave P3 shown in FIG. 11 in accordance with the ink ejection quantity in the correspondence table. The pulse wave P3 has a constant voltage of V2 volts from 0 second to T1 second, 0 volts from T1 second to T2 second, and returns to V2 volts after T2 second onward. The V2 volts is twice the voltage of the V1 volts. In other words, the amplitude of the pulse wave P3 is twice the amplitude of the pulse wave P1. Therefore, even if the hydraulic head difference between the meniscus formed at the opening of the nozzle 39 and the liquid level 98 becomes small, the quantity of ink ejected from the nozzle 39 can be suppressed by increasing the drive voltage, thereby maintaining the ink ejection quantity.

Modification 2

In the MFP 10, the pulse wave of the drive signal that drives the piezoelectric elements 45 may increase the number of shots to suppress a decrease in the quantity of ink ejected from the nozzles 39 and maintain the ink ejection volume.

Hereinafter, the pulse wave of the drive signal that drives the piezoelectric elements 45 of the MFP 10 according to the modification 2 will be explained with reference to FIGS. 12 and 13.

In modification 2, as in the embodiment, the pulse wave has a constant voltage of V1 volts when no ink is ejected from the 39 nozzles (not shown). When the command to start the image recording is input by the user via operation panel 17, the controller 130 outputs a drive signal of pulse wave P1 to the piezoelectric elements 45 (not shown), as in the embodiment. Each time the drive signal of the pulse wave P1 is output to the piezoelectric element 45 by the controller 130, one ink droplet 97 is ejected from the nozzle 39.

When the image recording is started and the ink is ejected, the hydraulic head difference between the meniscus formed at the opening of the nozzle 39 and the liquid level 98 decreases in proportion to the quantity of ink ejected.

Figure 12:
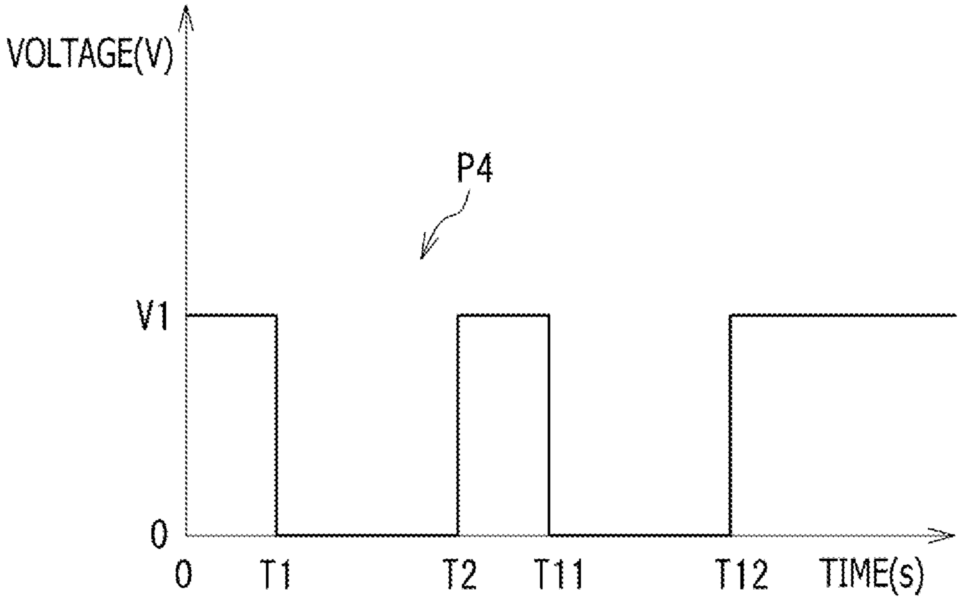
FIG. 12 shows another example of the pulse wave after the drive signal has been changed.
Figure 13:
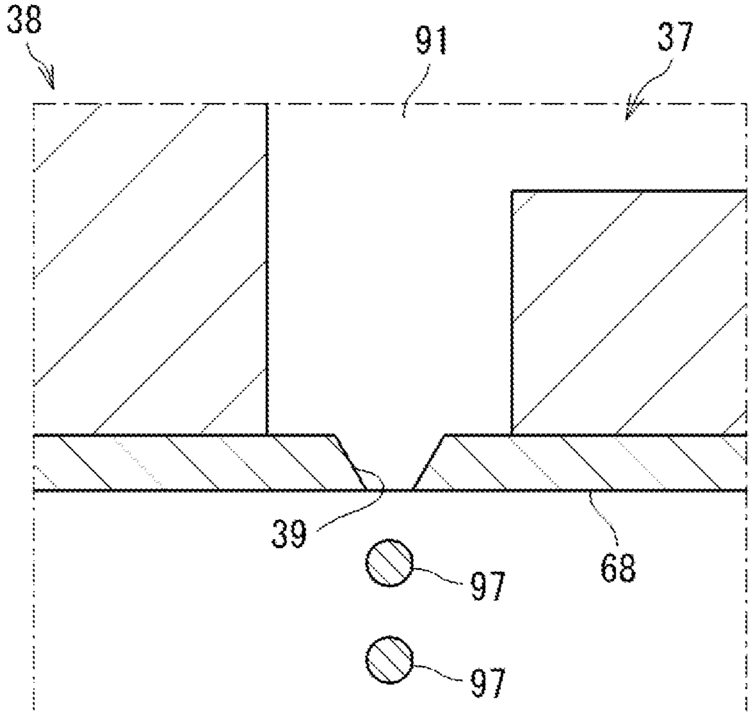
FIG. 13 is an enlarged sectional view of the nozzle and the ink channel showing the ink droplets when the pulse wave is in the state shown in FIG. 12.

The controller 130 outputs the drive signal of a pulse wave P4 shown in FIG. 12 to the piezoelectric elements 45 according to the ink discharge quantity in the correspondence table. The pulse wave P4 has a constant voltage of V1 volts from 0 to T1 seconds, 0 volts from T1 to T2 seconds, back to V1 volts from T2 to T11 seconds, 0 volts from T11 to T12 seconds, and back to V1 volts after T12 second onward. As shown in FIG. 13, every time the drive signal of the pulse wave P4 is output to the piezoelectric element 45 by the controller 130, two ink droplets 97 are ejected from the nozzle 39. The two ink droplets 97 are combined to form a single droplet, for example, before arriving at the printing sheet 12.

That is, the number of ink droplets 97 emitted by the pulse wave P1 is one, while the number of ink droplets 97 emitted by the pulse wave P4 is two. The number of ink droplets 97 to be ejected is preset in a correspondence table stored in memory 140. The number of ink droplets 97 to be ejected may be two or more. Even if the hydraulic head difference between the meniscus formed at the opening of the nozzle 39 and the liquid level 98 decreases, the decrease in the quantity of ink ejected from the nozzle 39 can be suppressed by increasing the number of ink droplets 97 to be emitted, thereby maintaining the ink ejection quantity.

Modification 3

In the MFP 10, the pulse wave of the drive signal for driving the piezoelectric elements 45 may be a waveform other than a square wave, for example, it may be a pulse wave in the form of a plurality of isosceles trapezoidal pulses.

Figure 14:
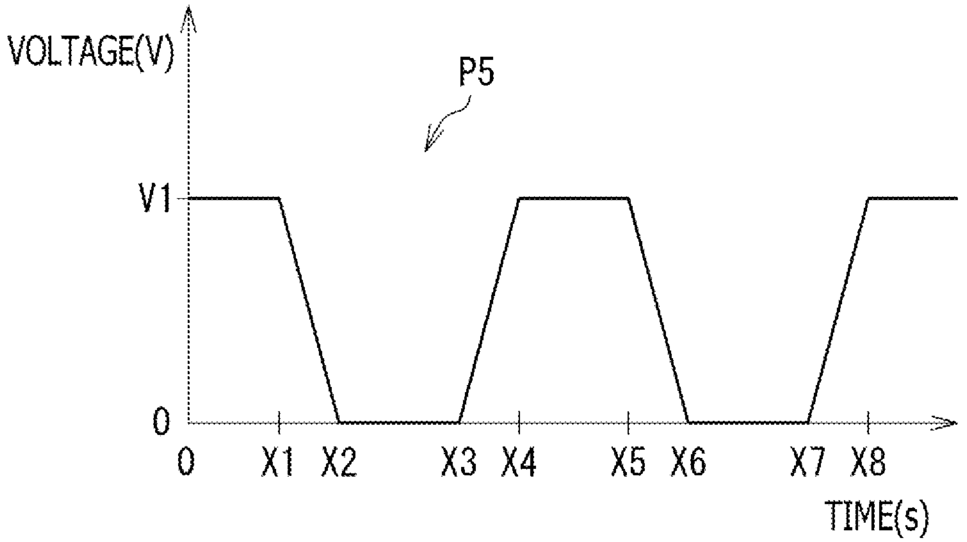
FIG. 14 shows an example of the pulse wave of the drive signal for driving the piezoelectric element.

Hereinafter, the pulse wave of the drive signal for driving the piezoelectric elements 45 of the MFP 10 according to a modification 3 will be described with reference to FIG. 14.

The isosceles trapezoidal pulse wave P5 has a constant voltage of V1 volts from 0 to X1 seconds, a voltage decreasing from V1 volts to 0 volts from X1 to X2 seconds, a constant voltage of 0 volts from X2 to X3 seconds, a voltage increasing from 0 volts to V1 volts from X3 to X4 seconds, a constant voltage of V1 volts from X4 to X5 seconds, a voltage decreasing from V1 volts to 0 volts from X5 to X6 seconds, the constant voltage of 0 volts from X6 to X7 seconds, and the voltage increasing from 0 volts to V1 volts from X7 to X8 seconds. When the pulse wave of the drive signal output to the piezoelectric element 45 is P5, two ink droplets 97 are ejected from the nozzle 39 each time the drive signal is output to the controller 130.

Modification 4

Figure 15:
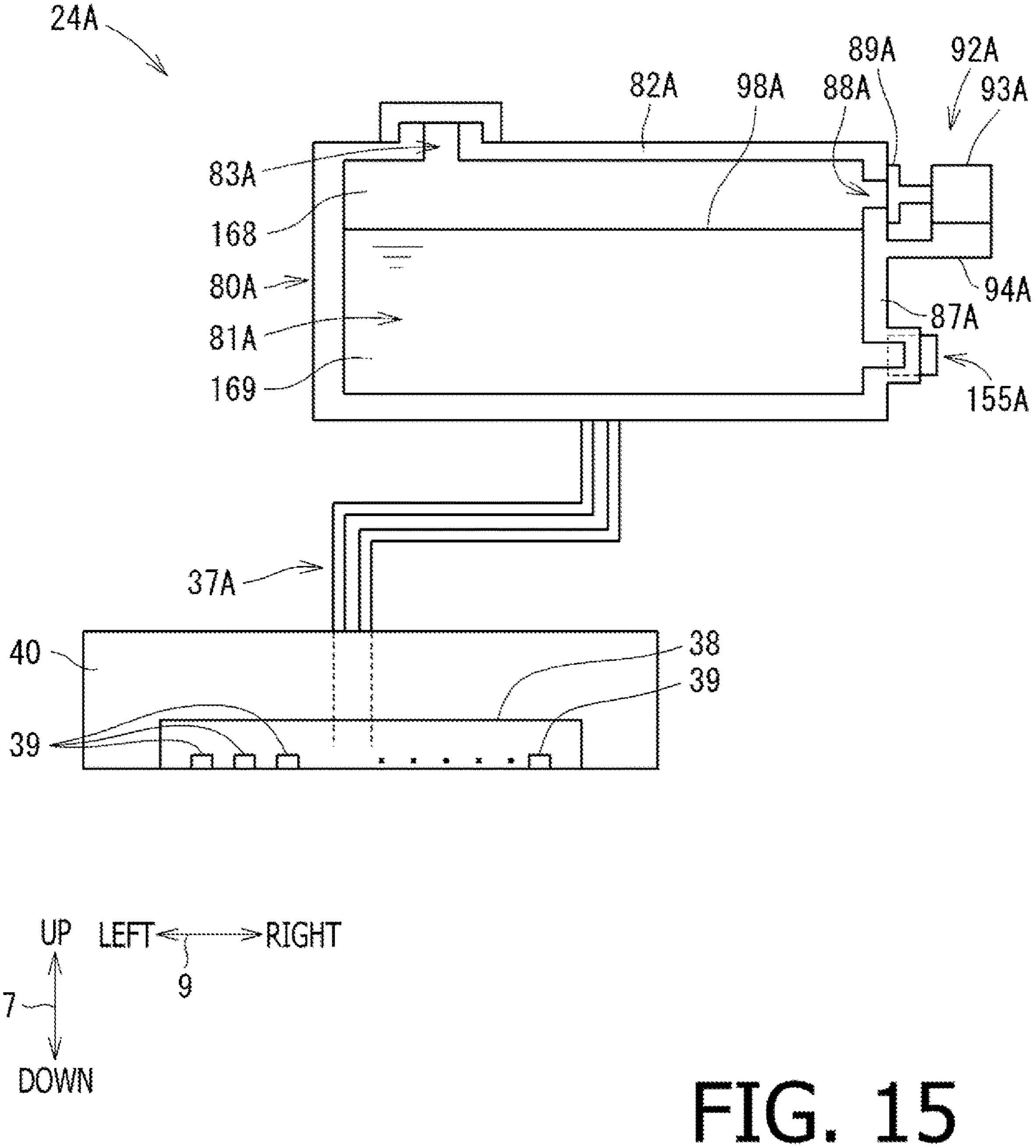
FIG. 15 is a cross-sectional view of a carriage of the MFP in which a reservoir is not mounted onto the carriage.

In the above embodiment, a case in which the reservoir 80 is mounted on the carriage 40 was described as an example. However, as shown in FIG. 15, a reservoir 80A does not have to be mounted on the carriage 40. The head 38 mounted on the carriage 40 may be connected to the reservoir 80A, which is not mounted on the carriage 40, via an ink channel 37A.

In a modification 4, a recorder 24A is equipped with the carriage 40 and the head 38. The head 38 is mounted on the carriage 40. The head 38 has multiple nozzles 39. The multiple nozzles 39 are connected to the reservoir 80A via the ink channel 37A.

According to the modification 4, the reservoir 80A is not mounted on the carriage 40 but provided to a frame part. The reservoir 80A has an internal space 81A. The internal space 81A is divided into a gas layer 168 and an ink layer 169. The ink layer 169 is connected to the multiple nozzles 39 via the ink channel 37A.

In the modification 4, the entire reservoir 80A is located at a higher level than the head 38. In addition, the height of the liquid level 98A of the maximum quantity of ink that can be stored in the reservoir 80A is higher than the openings of the nozzles 39.

A liquid level sensor 155A is provided on the lower part of a side wall 87A of the reservoir 80A.

On an upper wall 82A of the reservoir 80A, an inlet 83A is provided. On the side wall 87A, a solenoid valve 92A which makes an air vent 88A in a communicated or non-communicated state is also provided. The solenoid valve 92A has a valve 89A and a solenoid 93A that moves the valve 89A. The solenoid 93A is supported by a support stand 94A provided to the side wall 87A.

Modification 5

Figure 16:
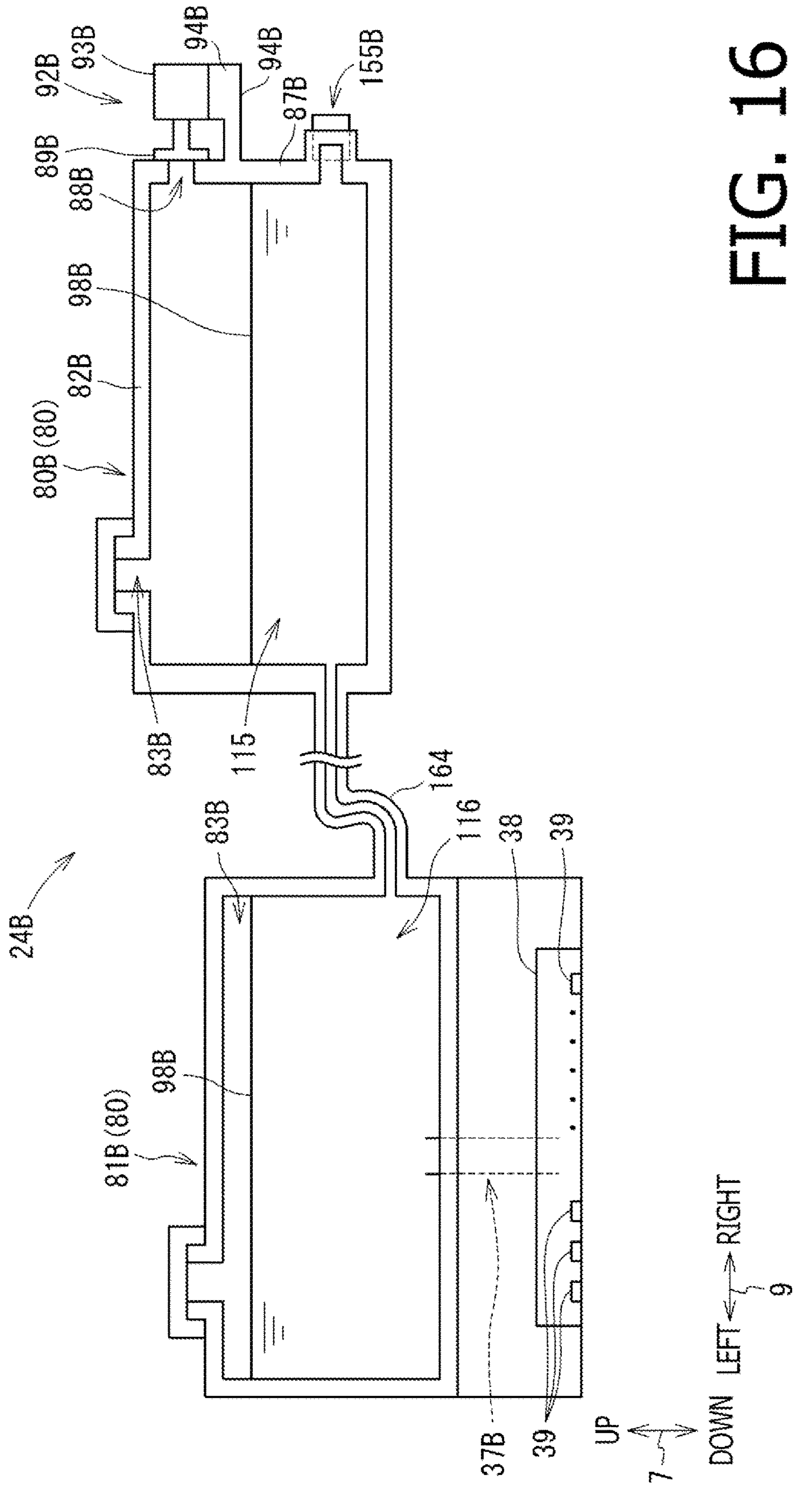
FIG. 16 is a cross-sectional view of a carriage of the MFP in which two reservoirs are provided to the carriage.

In the above embodiment, a case where the recorder 24 is equipped with one reservoir 80 was described as an example. However, as shown in FIG. 16, there may be provided a recorder 24B which has the reservoir 80 including a first reservoir 80B and a second reservoir 81B.

The first reservoir 80B has a first inner space 115, and the second reservoir 81B has a second inner space 116. The first inner space 115 is connected to the second inner space 116 by an ink distribution channel 164, allowing ink to flow. In addition, the second inner space 116 is connected to the head 38 by an ink channel 37B through which the ink can flow.

The ink distribution channel 164 is a tubular member having an inside space. The inner space of the ink distribution channel 164 is connected to the first inner space 115 and the second inner space 116 via through holes provided to the first reservoir 80B and the second reservoir 81B. Therefore, the liquid level 98B in the first inner space 115 and the liquid level 98B in the second inner space 116 are the same height.

The first inner space 115 is divided into a first gas layer 170 and a first ink layer 171. The second inner space 116 is divided into a second gas layer 172 and a second ink layer 173.

In the modification 5, all of the first and second reservoirs 80B and 81B are located at higher levels than the head 38. In addition, the height of the liquid level 98B of the maximum quantity of the ink that can be stored in the first reservoir 80B and the second reservoir 81B is higher than the openings of the nozzles 39.

A liquid level sensor 155B is provided on the lower part of the side wall 87B of the first reservoir 80B.

On the upper wall 82B of the first reservoir 80B, an inlet 83B is provided. In addition, on the side wall 87B, a solenoid valve 92B which makes the air vent 88B in a communicated state or non-communicated state is provided. The solenoid valve 92B has a valve 89B and a solenoid 93B that moves the valve 89B. The solenoid 93B is supported by a support stand 94B provided on the side wall 87B.

In the above embodiment, the head 38 is equipped with the piezoelectric elements 45, and ink droplets are ejected when the piezoelectric elements 45 are driven. However, the configuration can be modified. The head 38 may be equipped with a thermal actuator that generates bubbles in the ink by heat to eject ink droplets from the multiple nozzles 39. That is, the head 38 may be a thermal jet head, with a heater for ejecting ink droplets 97 from each of the nozzles 39. In this case, the decrease in the quantity of ink ejected from the nozzles 39 due to the decrease in the height of the liquid level is adjusted by increasing the number of ink droplet emissions. In addition, when the liquid level 98 of the ink is high, the number of ink droplets can be suppressed and the ink quantity can be reduced.

In the above embodiment, the method in which the head 38 records an image on the printing sheet 12 is a serial head type in which an image is recorded on the printing sheet 12 while the head 38 is moved by the carriage 40. However, the printing method may be of a line-head type, in which the recorder 24 is not equipped with the carriage 40 and the head 38 records the image on the printing sheet 12 without being moved. In the case of the line-head type, the head 38 is provided from the right end to the left end of the media passing area 36. In addition, the conveying and printing processes are executed in parallel and continuously. That is, the ink droplets 97 are continuously ejected from the nozzles 39 while the printing sheet 12 is being conveyed. Moreover, in the case of the line-head type, the head 38 is supported by a frame of the housing 14.

In the above embodiment, the reservoir 80 is installed in the carriage 40, and the ink is refilled by injecting the ink through the inlet 83. However, the reservoir 80 is not necessarily limited to such a configuration. The reservoir 80 may be a cartridge that can be detachably attached to the carriage 40. In such a case, when the ink stored in the cartridge runs low or runs out, the cartridge is replaced with a new one.

In the above embodiment, the reservoir 80 has one internal space 81. However, the reservoir 80 is not necessarily limited to such a configuration. The reservoir may have multiple inner spaces. In the multiple inner spaces of the reservoir, different colors of ink, such as black, cyan, magenta, yellow, or different types of ink, such as dye, pigment may be stored.

In such a case, the correspondence table that specifies the drive signals according to the hydraulic head difference between the meniscus formed at the opening of the nozzle and the liquid level may be specified so that drive signals can be output according to the physical properties of the ink, such as the type and viscosity of the ink. For example, in the correspondence table, when using inks with different viscosities or types, each ink color may be classified according to its viscosity and type, and the drive signal may be specified for each ink color according to the hydraulic head difference.

What is claimed is:

1. A liquid ejection device, comprising:
a head having a nozzle;
an element causing the nozzle to eject liquid;
a reservoir configured to store the liquid to be supplied to the nozzle; and
a controller
configured to change a drive signal to drive the element to control a size of the liquid ejected from the nozzle based on a quantity of the liquid stored in the reservoir.

2. The liquid ejection device according to claim 1,
further comprising a sensor configured to detect the quantity of the liquid stored in the reservoir,
wherein the controller is configured to change a pulse width of a waveform for driving the element based on the quantity of the liquid detected by the sensor.

3. The liquid ejection device according to claim 1,
further comprising a sensor configured to detect the quantity of the liquid stored in the reservoir,
wherein the controller is configured to change a driving voltage of the element based on the quantity of the liquid detected by the sensor.

4. The liquid ejection device according to claim 1,
wherein the controller is further configured to change a number of droplets to be ejected from the nozzle by driving the element according to the quantity of the liquid detected by a detector.

5. The liquid ejection device according to claim 1,
further comprising an air channel having an air opening communicating between a gas layer in the reservoir and outside the liquid ejection device.

6. The liquid ejection device according to claim 5,
further comprising a valve configured to open and close one of the air opening and the air channel,
wherein the controller is configured to drive the element with the valve being in a closed state.

7. The liquid ejection device according to claim 1,
wherein the reservoir is configured such that a height of liquid level of a maximum quantity of liquid storable in the reservoir is higher than an opening of the nozzle.

8. The liquid ejection device according to claim 1,
wherein the controller is configured to change the drive signal such that a driving amount of the element increases as the quantity of the liquid decreases.

9. The liquid ejection device according to claim 8,
further comprising a memory containing a table in which the quantity of the liquid and the drive signal are associated with each other,
wherein the controller is configured to determine the drive signal corresponding to the quantity of the liquid based on the table.

10. The liquid ejection device according to claim 9,
wherein the controller is configured to change the drive signal for each ink color.

11. The liquid ejection device according to claim 1,
wherein the controller is configured to:
count a count value indicating the quantity of the liquid ejected from the nozzle; and
obtain the quantity of the liquid based on the count value.

12. The liquid ejection device according to claim 11,
further comprising a sensor configured to detect whether or not a liquid level of the liquid stored in the reservoir is equal to or less than a particular position,
wherein the controller is configured to obtain the quantity of the liquid based on an output signal of the sensor and the count value.

13. The liquid ejection device according to claim 11,
further comprising a display and an operation panel,
wherein the controller is configured to:
display an inquiry screen inquiring a user whether the liquid is refilled in the reservoir in response to power of the liquid ejection device being turned on; and
reset the count value in response to the operation panel receiving an input indicating the liquid is refilled in the reservoir after displaying the inquiry screen.

14. The liquid ejection device according to claim 1,
wherein the element is an actuator configured to fluctuate a volume of a liquid channel connected with the nozzle in accordance with the drive signal.

15. A liquid ejection device, comprising:
a head having a nozzle;
an element causing the nozzle to eject liquid;
a reservoir configured to store the liquid to be supplied to the nozzle; and
a controller configured to change a drive signal to drive the element to change a number of droplets to be ejected from the nozzle based on a quantity of the liquid stored in the reservoir detected by a detector.

16. A liquid ejection device, comprising:
a head having a nozzle;
an element causing the nozzle to eject liquid;
a reservoir configured to store the liquid to be supplied to the nozzle; and
a controller configured to change a drive signal to drive the element based on a quantity of the liquid stored in the reservoir such that a driving amount of the element increases as the quantity of the liquid decreases.

17. The liquid ejection device according to claim 16,
further comprising a memory containing a table in which the quantity of the liquid and the drive signal are associated with each other,
wherein the controller is configured to determine the drive signal corresponding to the quantity of the liquid based on the table.

18. The liquid ejection device according to claim 17,
wherein the controller is configured to change the drive signal for each ink color.

* * * * *